(12) United States Patent
Harris et al.

(10) Patent No.: US 12,498,686 B1
(45) Date of Patent: Dec. 16, 2025

(54) SYSTEMS AND METHODS FOR AUTOMATED CAR WASH FACILITY THROUGHPUT CONTROL

(71) Applicant: MW POS, Inc., Arlington, VA (US)

(72) Inventors: Nathan Alan Harris, Washington, DC (US); Joshua Richard Dotson, Cuyahoga Falls, OH (US); James Hodges McAliley, Charleston, SC (US); Aaron Mykal Clint, Stewartsville, MT (US); Jonathan David Hester, Charlotte, NC (US)

(73) Assignee: MW POS, Inc., Arlington, VA (US)

( * ) Notice: Subject to any disclaimer, the term of this patent is extended or adjusted under 35 U.S.C. 154(b) by 0 days.

(21) Appl. No.: 19/189,015

(22) Filed: Apr. 24, 2025

Related U.S. Application Data

(63) Continuation of application No. 19/081,774, filed on Mar. 17, 2025.

(Continued)

(51) Int. Cl.
  *G05D 1/224* (2024.01)
  *B60S 3/04* (2006.01)
  (Continued)

(52) U.S. Cl.
  CPC ............ *G05B 15/02* (2013.01); *B60S 3/04* (2013.01); *G05D 1/224* (2024.01); *G06V 20/54* (2022.01); *G06V 2201/08* (2022.01)

(58) Field of Classification Search
  USPC .......................................................... 700/275
  See application file for complete search history.

(56) References Cited

U.S. PATENT DOCUMENTS 9,405,988 B2  8/2016  Alves
2001/0020198 A1*  9/2001  Wilson ............... B67D 7/067
                                                705/14.27

(Continued)

FOREIGN PATENT DOCUMENTS

CN  105205499 A  12/2015
JP  2020135898 A * 8/2020

OTHER PUBLICATIONS

Non-Final Office Action on U.S. Appl. No. 19/188,968 dated May 30, 2025.

(Continued)

*Primary Examiner* — Emilio J Saavedra
(74) *Attorney, Agent, or Firm* — Foley & Lardner LLP

(57) ABSTRACT

One or more processors coupled to memory can maintain a first queue of vehicles comprising a first vehicle and a second vehicle and transmit, to a controller of a car wash tunnel system maintaining a second queue, a first instruction to add information about the first vehicle into the second queue, a status of the second queue updated subsequent to the car wash tunnel system permitting the first vehicle to enter a car wash tunnel. The one or more processors can poll the controller to determine a change in the status of the second queue, determine, based on the change in the status, that the second queue is available to receive a next vehicle, and transmit a second instruction to add information about the second vehicle into the second queue to cause the car wash tunnel system to permit the second vehicle to enter the car wash tunnel.

20 Claims, 18 Drawing Sheets

Related U.S. Application Data

(60) Provisional application No. 63/699,778, filed on Sep. 26, 2024, provisional application No. 63/738,281, filed on Dec. 23, 2024.

(51) Int. Cl.
  *G05B 15/02* (2006.01)
  *G06V 20/54* (2022.01)

(56) References Cited

U.S. PATENT DOCUMENTS

| | | |
|---|---|---|
| 2002/0140577 A1 | 10/2002 | Kavner |
| 2006/0180647 A1 | 8/2006 | Hansen |
| 2008/0222004 A1* | 9/2008 | Pollock .............. G06Q 30/0613 |
| | | 705/15 |
| 2009/0057401 A1 | 3/2009 | Brott et al. |
| 2011/0288909 A1 | 11/2011 | Hedley et al. |
| 2013/0204798 A1 | 8/2013 | Gabrysch et al. |
| 2015/0049914 A1 | 2/2015 | Alves |
| 2018/0268238 A1 | 9/2018 | Khan et al. |
| 2019/0043201 A1 | 2/2019 | Strong et al. |
| 2020/0294052 A1 | 9/2020 | Cacciami |
| 2021/0150499 A1* | 5/2021 | Fazio ...................... G07F 17/20 |
| 2022/0092996 A1 | 3/2022 | Korngold et al. |
| 2023/0004899 A1* | 1/2023 | van Breen ......... G06Q 30/0637 |
| 2023/0249653 A1* | 8/2023 | Stoel ................... G07F 17/0035 |
| | | 705/1.1 |
| 2024/0185566 A1 | 6/2024 | Thomas et al. |
| 2024/0311937 A1* | 9/2024 | Siefken ................. G06Q 50/12 |
| 2024/0331393 A1 | 10/2024 | Petrey et al. |
| 2024/0378570 A1 | 11/2024 | Steele et al. |
| 2024/0378925 A1 | 11/2024 | Nichols et al. |

OTHER PUBLICATIONS

Non-Final Office Action on U.S. Appl. No. 19/188,968 dated Jun. 18, 2025.
Notice of Allowance on U.S. Appl. No. 19/189,021 DTD Oct. 24, 2025.

* cited by examiner

SYSTEMS AND METHODS FOR AUTOMATED CAR WASH FACILITY THROUGHPUT CONTROL

CROSS-REFERENCES TO RELATED APPLICATIONS

This application is a continuation and claims the benefit of priority under 35 U.S.C. § 120 to U.S. Non-Provisional patent application Ser. No. 19/081,774, filed Mar. 17, 2025, which claims the benefit of priority under 35 U.S.C. § 119 to U.S. Provisional Patent Application No. 63,699,778, filed Sep. 26, 2024, and to U.S. Provisional Patent Application No. 63/738,281, filed Dec. 23, 2024, all of which are hereby incorporated by reference herein in their entirety and for all purposes.

BACKGROUND

Vehicle service facilities, including car wash establishments, have evolved to meet the growing demand for efficient and convenient vehicle care. These facilities can include various devices, systems and machinery to automate various aspects of the services provided, including various car wash systems for servicing different vehicles.

SUMMARY

Technical solutions described herein are directed to systems and methods for automating car wash facility operations using intelligent traffic management. Automated vehicle service facilities, such as car wash facilities, can experience technical challenges while managing throughput of vehicles serviced by the facility. When employing different systems that maintain own queue of vehicles being serviced, discrepancies may arise between different system queues. For example, it can be a challenge to utilize queue data of a system maintaining a queue of vehicles to automate operation of a car wash tunnel system controller that is configured to operate based on manual user updates to its single vehicle queue. In such configurations, a controller for operating a car wash tunnel system may necessitate a manual user indication and input of vehicles into the queue in order for the car wash tunnel system to operate, thereby precluding automated car wash operations or utilization of externally maintained vehicle queue data. Such issues can lead to operational challenges, including delay in providing vehicle services, inefficient traffic flow management, and a limited capacity of an operator of the car wash system, all of which can lead to a waste in resources and energy.

To overcome these challenges, the technical solutions utilize a queue management system providing automated queue updates for improved traffic flow and management and a visual representation of the queue, resulting in resource and energy savings and improved customer satisfaction while reducing operational errors. The technical solutions can include a system maintaining a system queue of vehicles awaiting vehicle services by the facility. The solutions can transmit from the system queue vehicle information into a single-vehicle queue of the car wash tunnel system controller and poll the controller to detect changes in the status of the single-vehicle car wash tunnel system queue. Responsive to the detected change in status, the solutions can determine that a next vehicle from the system queue can enter the car wash tunnel system and transmit an instruction to add the data of the next vehicle into the single-vehicle car wash system queue. In doing so, the technical solutions can automate the manual car wash system, allowing for a more efficient traffic flow and savings in resources and system energy.

Moreover, the technical solutions can overcome the challenges of inefficient and impractical graphical user interface (GUI) layouts for real-time informing of facility operators on the statuses or issues involving vehicles at different lanes of the facility. The technical solutions can provide a GUI system providing facility operators with real-time updates on vehicle information, services provided and statuses of various issues that vehicles in the queue may experience, allowing for more resource and energy efficient services. The system can generate and update GUI data objects for display on a screen alongside updates to the queue of the car wash tunnel system controller and statuses of issues encountered by vehicles at different lanes of the facility. The data objects can display, for example, vehicles images, license plate information or data of vehicles at given facility lanes allowing for real-time issue status updates between the operators servicing the facility, thereby improving both the user experience as well as the resource and energy efficiency of the system and services provided.

At least one aspect of the technical solutions is directed to a system. The system can include one or more processors, coupled with memory, to maintain a first queue of vehicles comprising a first vehicle and a second vehicle. The one or more processors can transmit to a controller of a car wash tunnel system maintaining a second queue, a first instruction to add information about the first vehicle into the second queue, a status of the second queue updated subsequent to the car wash tunnel system permitting the first vehicle to enter a car wash tunnel. The one or more processors can poll the controller to determine a change in the status of the second queue. The one or more processors can determine, based on the change in the status, that the second queue is available to receive a next vehicle. The one or more processors can transmit to the controller responsive to the determination, a second instruction to add information about the second vehicle into the second queue to cause the car wash tunnel system to permit the second vehicle to enter the car wash tunnel.

In some implementations, the information identifies a service to be provided to at least one of the first vehicle or the second vehicle by the car wash tunnel system and the controller is configured to control one or more components of the car wash tunnel system according to the service. The polling can be implemented over a serial connection. The second queue can be configured to hold data for only a single vehicle to be serviced by the car wash tunnel system. The polling can include a sequence of requests for the status of the second queue, the sequence of requests transmitted according to a predefined time period. The one or more processors can receive, from an operator device, a wireless signal and transmit, to the controller, the second instruction responsive to the wireless signal. The one or more processors can receive from a tunnel camera capturing one or more images of vehicles at an entrance of the car wash tunnel, the one or more images of the vehicles and update an order of at least the first vehicle or the second vehicle in the first queue using the one or more images.

In some implementations, the one or more processors determine, following the second vehicle entering the car wash tunnel, that the second vehicle is not in the second queue and validate the car wash service identified by the information is provided to the second vehicle in response to the second vehicle determined to not be in the second queue. The one or more processors can cause a third party server to perform one or more operations using data of an entity profile associated with the second vehicle, in response to the validation. The one or more operations can include at least one of a point of sale transaction implemented using the third party system or an update to a log associated with at least one of the entity profile or a vehicle profile of the second vehicle. The one or more processors can identify, based on one or more images captured by one or more cameras of a facility comprising the car wash tunnel system, a feature of the second vehicle and activate the subset of the components of the car wash system for providing a service to the second vehicle based on the vehicle feature. At least one of the first instruction or the second instruction can include an enter queue command provided over a serial connection. The polling the controller can include emulating a keypad of the controller to transmit a command for polling using a plurality of requests to refresh the status of the second queue. The polling can be provided responsive to a signal generated in response a selection on a graphical user interface of an operator device.

At least one aspect of the present disclosure is directed to another system. The system can include one or more processors coupled with memory. The one or more processors can provide, based on a first vehicle in a first lane of a plurality of lanes of a facility, to each operator device of a plurality of operator devices executing a mobile application, first data corresponding to the first vehicle to cause the mobile application to present a first data object generated using the first data at a first portion of a graphical user interface (GUI) for displaying data of vehicles at the first lane, the first data object comprising a first image of the first vehicle and a first license plate information of the first vehicle. The one or more processors can provide, based on a second vehicle in a second lane of the plurality of lanes, to each operator device of the plurality of operator devices, second data corresponding to the second vehicle to cause the mobile application to present a second data object generated using the second data at a second portion of the GUI for displaying data of vehicles at the second lane, wherein the second data object is presented concurrently with the first data object, the second data object comprising a second image of the second vehicle and a second license plate information of the second vehicle. The one or more processors can transmit, responsive to determining that the first vehicle is not in the first lane, to each operator device of the plurality of operator devices, an instruction to cause the mobile application to cease the presentation of the first data object at the first portion of the GUI. The one or more processors can determine, subsequent to the transmission of the instruction, that a third vehicle of the plurality of vehicles is in the first lane and transmit, based on the third vehicle in the first lane, to each operator device of the plurality of operator devices, third data corresponding to the third vehicle to cause the mobile application to present at the first portion of the GUI a third data object generated using the third data, the third data object comprising a third image of the third vehicle and a third license plate information of the third vehicle.

In some implementations, at least one of the first data, the second data or the third data include at least one of: a status of a lane, entity data associated with an entity profile, or vehicle data associated with a vehicle profile linked to the entity profile entity profile. At least one of the first data object, the second data object, or the third data object generated using the at least one of the first data, the second data or the third data is color coded based on a status of an operation associated with a third party server. The one or more processors can transmit, responsive to determining that the first vehicle is not in the first lane, to each operator device of the plurality of operator devices, a placeholder data to cause the mobile application to present at the first portion of the GUI a placeholder data object generated using the placeholder data, the placeholder data object comprising an indication that the first lane is empty. The placeholder data can be transmitted to each operator device of the plurality of operator devices in response to ceasing the presentation of the first data object at the first portion of the GUI. The one or more processors can extract information from one or more images of the first vehicle in the first lane and identify, using a data structure, information associated with an entity profile associated with the first vehicle. The one or more processors can select the first data based on the information associated with the entity profile and generate a data package comprising the first data for transmission to each operator device of the plurality of operator devices.

In some implementations, the data package includes one or more instructions to cause each of the plurality of operator devices to generate the first data object by placing the information associated with the entity profile into one or more sub-portions of the first portion. The first data can include an identifier for the first portion of the GUI. The one or more processors can extract, from a database, one or more field value pairs including at least one of: a license plate and a series of characters of the license plate of the first vehicle, a vehicle type and a make and model information of the first vehicle, a vehicle color information and an name of a color of the first vehicle and construct the first data using the extracted one or more field value pairs. The one or more processors can extract, from an entity profile associated with a driver of the second vehicle, data about the driver and generate, based on the information about the driver, a note for display in the second portion of the GUI. The one or more processors can identify an issue associated with the second vehicle, the issue corresponding to at least one of a point of sale operation or a selection of service to provide at the facility and transmit, responsive to the identifying of the issue, fourth data corresponding to the second vehicle to cause the mobile application to present at the second portion of the GUI a fourth data object generated using the fourth data, the fourth data object including a request to assist with the issue associated with the second vehicle.

In some implementations, the one or more processors can receive, from a first operator device of the plurality of operator devices, a response to the request to assist and transmit, responsive to the response to the indication, fifth data to cause the mobile application to present, at the second portion of the GUI of at least a subset of the plurality of operator devices that excludes the first operator device, a fifth data object generated using the fifth data, the fifth data object including an indication that the issue associated with the second vehicle in being addressed. The one or more processors can transmit, responsive to the response to the indication, sixth data to cause the mobile application of the first operator device to present a sixth data object generated using the sixth data, the sixth data object including one or more windows to address the issue associated with the second vehicle. The one or more processors can receive, from the first operator device subsequent to the response to the request, an updated response to the request to assist and transmit, responsive to the updated response, sixth data to cause the mobile application to present, at the second portion of the GUI of at least the subset of the plurality of operator devices, a sixth data object generated using the sixth data, the sixth data object comprising an indication that the issue associated with the second vehicle is addressed. The one or more processors can transmit, responsive to an indication that the issue associated with the second vehicle is addressed, to a controller for a gate of the second lane, an instruction to actuate the gate. The one or more processors can identify a queue of one or more vehicles for entering a tunnel of the facility and include, following the instruction to actuate the gate, into the queue of vehicles, an entry corresponding to the second vehicle. The one or more processors can transmit, responsive to determining that the second vehicle is not in the second lane, request for information of a next vehicle in the second lane. The one or more processors can identify, responsive to the first data, information associated with a car wash service to provide to the first vehicle in a tunnel of the facility.

DETAILED DESCRIPTION

Figure 1:
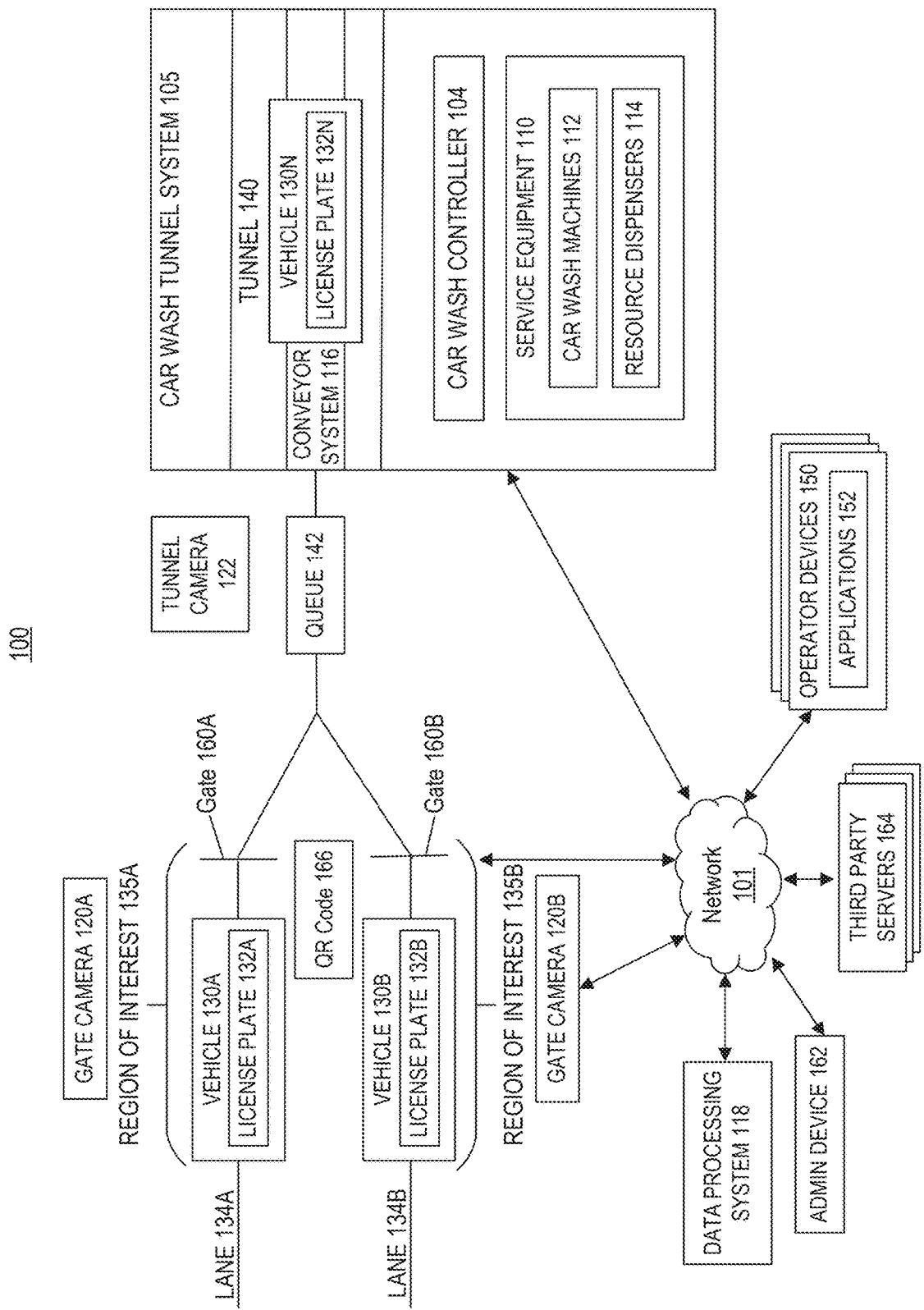
FIG. 1 is an example block diagram of a system for automated operation platform for a vehicle service facility.

For purposes of reading the description of the various implementations below, the following descriptions of the sections of the specification and their respective contents may be helpful:

Section A describes an overview of a service facility and its computing environment.

Section B describes systems and methods for automated car wash facility throughput control.

Vehicle service facilities, particularly automated car wash facilities, can face numerous technical challenges in maintaining energy and time efficient and error-free operations. These challenges can include discrepancies arising between different system queues when employing different systems that maintain own queue of vehicles in the car wash facility. For example, a system to control the car wash may only maintain a single vehicle queue, making it a challenge to automate operation of the car wash and leading to potential service disruptions. In such configuration, a manual indication may be needed to add and send vehicles in the single vehicle queue, precluding automated and customized car wash services and limiting the capacity of an operator of the car wash facility, which can result in inefficient use of resources and longer wait times. These technical hurdles can impede the operation of automated vehicle service facilities and can cause reduced energy efficiency, increased errors, and diminished customer satisfaction.

To address these challenges, the technical solutions of this disclosure provide an automated platform that improves the reliability of operations of the facility at improved energy efficiency and customer satisfaction. The solutions can utilize polling technology to accurately determine a status of the car wash tunnel system controller queue, and update the queue based on the status to maintain a consistent, steady flow of vehicles into the car wash tunnel system without delays. The polling technology can both determine the status, and transmit instructions to add information regarding the next vehicle in queue to the single vehicle queue of the car wash tunnel system. The automated polling and status determination can reduce service disruptions, reduce down times, and allow the operator (e.g., of the facility) to be mobile, thereby improving efficiency, conserving energy, and providing opportunities for further facility enhancement by at least the operator. As a result, the technical solutions allow for operating of a more energy-efficient, environmentally friendly, cost-effective vehicle service facility, and an improved customer satisfaction, than was the case with vehicles service systems.

Furthermore, the technical solutions can address the challenges of inefficient and uninformative GUI layouts for real-time status updates and communication to facility operators on issues involving vehicles at different lanes of the facility. The technical solutions can provide a GUI system to generate data objects including notifications, vehicle information, alerts, and services being provided to each vehicle in the service facility, thereby enabling more resource and energy efficient services. The GUI system can generate the data objects to indicate a location of the vehicle at the facility and a position of the vehicle in the queue such that, responsive to a vehicle needing assistance, at least one operator can easily identify the vehicle and provide assistance. The technical solutions can provide a mobile device application to display such data objects that can allow operators to improve their ability to monitor and control facility operations remotely, reducing the need for constant on-site presence and associated resource inefficiencies. For example, the location, status, image, and vehicle information can be displayed on the mobile device application, thereby facilitating operation and increasing a capability of the service facility to provide customized service to each vehicle. As a result, the technical solutions allow for operating of a more energy-efficient, environmentally friendly, and cost-effective vehicle service facility while also improving customer satisfaction than was the case with vehicles service systems.

A. Overview of a Service Facility Computing Environment

The system of the technical solutions can include a computing environment having any combination of hardware and software for providing automated car wash facility throughput control.

FIG. 1 illustrates an example block diagram of a facility 100, which can also be referred to as a facility system or a service environment, for providing a service to vehicles 130 or vehicle drivers. The facility 100 can include any combination of an indoor or outdoor area of a facility, space or a structure (e.g., a building) that can be configured or used as a location for deploying service systems, such as a car wash tunnel system 105 configured to provide services, such as car wash services, to vehicles 130 or their drivers. The facility 100 can include one or more outdoor areas that can include pathways or lanes 134 for directing or controlling the vehicles 130 arriving for service to be performed by the service system, such as the car wash tunnel system 105, at which the vehicle services are provided. The facility 100 can be, or include any type of a service facility, such as a car wash facility, a vehicle technical or a maintenance service facility (e.g., a system-based or automated oil change establishment), a fast food restaurant with a drive through for servicing drivers in the vehicles, an automated parking garage, a gas station, an event venue (e.g., a sports stadium) having vehicle parking centers, or any other facility managing or providing services involving vehicles or their drivers (e.g., drivers).

The facility 100 can include one or more of car wash tunnel systems 105 that can have one or more tunnels 140 with service equipment 110 configured to provide vehicle services, such as car washing, to various vehicles 130 passing through the tunnel 140. Each tunnel 140 can include one or more conveyor systems 116 over or onto which the vehicles 130 can be transported, passed or moved. For instance, a vehicle 130N identified by a license plate 132N can coupled or latched with the conveyor system 116 and moved, pushed or passed through the tunnel 140 as the service equipment 110 of the car wash tunnel system 105 provides automated car wash service. The car wash tunnel system 105 can include one or more car wash controllers 104 for controlling the one or more service equipment 110, which can include, for example, various car wash machines 112 and resource dispensers 114 for performing the automated car wash operations.

The facility 100 can include one or more lanes 134 for directing vehicle traffic towards the car wash tunnel system 105. For example, a facility 100 can include an external or outdoor space having a first lane 134A on which a first vehicle 130A identified by a first license plate 132A can move towards a first gate 160A. The facility 100 can include a second lane 134B on which a second vehicle 130B identified by a second license plate 132B can move towards a second gate 160B. The first lane 134A can include or encompass a first region of interest 135A that can be viewed, recorded or monitored by a first gate camera 120A capturing images or videos of the vehicle 130A as this vehicle approaches or passes the gate 160A controlling this vehicle's access to a queue 142 for entering tunnel 140 of the car wash tunnel system 105. Similarly, the second lane 134B can include a second region of interest 135B that can be recorded or monitored by a second gate camera 120B capturing images or videos of the vehicle 130B as it approaches or passes the gate 160B controlling this vehicle's access to the queue 142.

The facility can include one or more quick response (QR) codes 166, which can be deployed at any location in the facility environment (e.g., along or adjacent to lanes 134, gates 160 or a structure housing a car wash tunnel system 105. A QR code 166 can include any two-dimensional barcode that can store or represent data such as URLs, text, or other types of information that can be read by a smartphone of a driver of the vehicle 130 or other QR code reader. When a user (e.g., a driver) takes a picture of the QR code 166 or otherwise captures the QR code with their mobile device, the QR code 166 can (e.g., include data) be used to cause the mobile device of the user to open an application or a webpage corresponding to the QR in which the user can select services to utilize, change their service type (e.g., monthly or annual subscription), and configure particular services (e.g., polishing of the vehicle, special type of washing service). The QR code 166 can be used to facilitate interaction between the user and the service provider, improving the user experience by providing an efficient way to access and manage services.

The gate cameras 120 and the gates 160 can be communicatively coupled with a data processing system 118, via one or more networks 101 of the facility system 100. The network 101 can communicatively couple and provide communication medium for one or more operator devices 150 executing applications 152, one or more third party servers 164 executing third party services (e.g., transaction operations) and one or more administrative devices 162 for providing administrative overview and services to the facility system 100. The network 101 can provide, enable, or otherwise facilitate the connections for communications between the data processing system 118 and gate cameras 120 to provide images or videos of the vehicles 130 and their license plates 132 to the data processing system to identify the service according to the entity profiles associated with the vehicles 130.

Facility 100 can include any combination of an indoor or outdoor area of a facility, space, or structure configured for deploying service systems, such as a car wash tunnel system 105. Facility 100 can be a car wash facility, a vehicle maintenance service facility, a fast food restaurant with a drive-through, an automated parking garage, a gas station, or an event venue with vehicle parking centers. Facility 100 can include pathways or lanes 134 for directing vehicles 130 arriving for service to be performed by the service system, such as car wash tunnel system 105. For instance, facility 100 can have outdoor areas with lanes 134 guiding vehicles 130 towards car wash tunnel system 105. Facility 100 can manage or provide services involving vehicles or their drivers, such as drivers. Facility 100 can include regions of interest 135 monitored by gate cameras 120 to capture images or videos of vehicles 130 as they approach or pass gates 160. Facility 100 can be communicatively coupled with data processing system 118, operator devices 150, third party servers 164, and admin devices 162 via network 101.

The facility 100 can include a building, a structure, or a service center at which vehicles 130 are cleaned, serviced, upgraded, or repaired or at which drivers of the vehicles receive services. The facility 100 can include, for example, exits and entrances, wash lanes, a wash tunnel, service bays, staffing, sensors, wash components, automated kiosks, among others to provide a service to a customer in the content of a washing, or any other, service. The facility 100 can include systems or processes, involving for example, service equipment 110 data processing systems 118, which can be overseen, managed, run, or otherwise controlled by operators, which can be authorized personnel, such as users of the operator devices 150 or admin device 162. The operators can include workers, technicians, managers, administrators, among other authorized personnel.

Car wash tunnel system 105 can include one or more tunnels 140 with service equipment 110 configured to provide vehicle services, such as car washing services. For example, car wash tunnel system 105 can have tunnels 140 with conveyor systems 116 over which vehicles 130 can be moved, guided or transported. Car wash tunnel system 105 can include car wash controllers 104 for controlling service equipment 110, which can include car wash machines 112 and resource dispensers 114. For instance, a vehicle 130 identified by a license plate 132 can be coupled with conveyor system 116 and moved through tunnel 140 as service equipment 110 provides automated car wash service. For instance, upon identifying a vehicle 130A, the car wash tunnel system 105 can be instructed to apply a particular set of car wash operations by the service equipment 110 in accordance with the settings or configurations for the account of the vehicle. Car wash tunnel system 105 can perform various automated car wash operations using car wash machines 112 and resource dispensers 114. Car wash tunnel system 105 can be deployed within a building or a structure at a facility 100, which can be accessed via lanes 134 and gates 160 controlling the flow of vehicles 130 to the tunnel 140. Car wash tunnel system 105 can be communicatively coupled with data processing system 118 to receive instructions for controlling service equipment 110.

Car wash controller 104 can include any combination of hardware and software for controlling service equipment 110 in car wash tunnel system 105. For example, car wash controller 104 can control car wash machines 112 and resource dispensers 114 to perform automated car wash operations. Car wash controller 104 can receive instructions from data processing system 118 to execute car wash routines based on vehicle features and license plate information. Car wash controller 104 can selectively control the deployment of car wash actuation components based on vehicle features identified from images captured by gate cameras 120 and tunnel cameras 122. For instance, car wash controller 104 can control the application of fluids or physical contact materials onto the vehicle during the car wash routine. Car wash controller 104 can be communicatively coupled with car wash tunnel system 105, data processing system 118, and other components of facility 100 via network 101. Car wash controller 104 can control the service equipment 110 to perform the car wash services according to car wash types designated or dedicated to the operator device. The car wash controller 104 can ensure that the car wash service is performed according to the service request generated by data processing system 118.

Service equipment 110 can include any combination of devices and machinery configured to provide vehicle services in car wash tunnel system 105. For example, service equipment 110 can include car wash machines 112, such as brush rollers, high pressure washers and drying blowers, as well as resource dispensers 114, such as soap and water dispensers, wax dispensers or tire shine dispensers, each of which can be utilized for performing automated car wash operations. Service equipment 110 can be controlled by car wash controller 104 to execute car wash routines based on vehicle features and license plate information. For instance, service equipment 110 can include brushes, sprayers, and dryers that clean and dry the vehicle as it passes through tunnel 140. Service equipment 110 can be configured to apply fluids or physical contact materials onto the vehicle during the car wash routine. Service equipment 110 can be part of car wash tunnel system 105 and can be accessed via lanes 134 and gates 160. Service equipment 110 can be communicatively coupled with car wash controller 104 and data processing system 118 to receive instructions for performing car wash operations.

Car wash machines 112 can include any combination of mechanical devices configured to perform automated car wash operations in car wash tunnel system 105. For example, car wash machines 112 can include automated machinery, such as brushes, rollers, and sprayers that clean the vehicle as the vehicle 130 passes through tunnel 140. Car wash machines 112 can include brush rollers, high-pressure washers, foam applicators, undercarriage washers, wheel cleaners, drying blowers, polishers, wax applicators and tire shiners. Car wash machines 112 can be arranged or deployed within or along the tunnel 140 to provide their designated operations or services to the vehicles 130 passing down the conveyor system 116. Car wash machines 112 can be controlled by car wash controller 104 to execute car wash routines based on vehicle features and license plate information. For instance, car wash machines 112 can apply soap, water, and wax to the vehicle during the car wash routine. Car wash machines 112 can be part of service equipment 110 and can be accessed via lanes 134 and gates 160. Car wash machines 112 can be configured to selectively control the application of fluids or physical contact materials onto the vehicle based on instructions from car wash controller 104. Car wash machines 112 can be communicatively coupled with car wash controller 104 and data processing system 118 to receive instructions for performing car wash operations.

Resource dispenser 114 can include any combination of devices configured to dispense resources, such as fluids, energy or materials, during the car wash routine in car wash tunnel system 105. For example, resource dispenser 114 can include automated dispensers of resources, including sprayers, nozzles, and dispensers that apply soap, water, and wax to the vehicle 130. Resource dispensers 114 can include dispensers for soap, water, wax, foam, tire shine, polish, spot-free rinse, conditioners, sealants, air, including heated air or any other resource used for vehicle service. Resource dispenser 114 can be controlled by car wash controller 104 to execute car wash routines based on vehicle features and license plate information. For instance, resource dispenser 114 can selectively control the application of fluids onto the vehicle during the car wash routine. Resource dispenser 114 can be part of service equipment 110 and can be accessed via lanes 134 and gates 160. Resource dispenser 114 can be configured to apply fluids or materials onto the vehicle based on instructions from car wash controller 104. Resource dispenser 114 can be communicatively coupled with car wash controller 104 and data processing system 118 to receive instructions for performing car wash operations.

Tunnel 140 can include any combination of structures and pathways configured to guide vehicles 130 through car wash tunnel system 105. The tunnel 140 can include a conveyor system 116 or a conveyor belt on which or down which vehicles 130 can be moved, pushed or transported as the car washing is provided by the service equipment 110. Tunnel 140 can include any configurations or arrangements of service equipment 110, such as car wash machines 112 and resource dispensers 114, positioned to provide automated car wash services. For instance, a vehicle 130 identified by a license plate 132 can be coupled with conveyor system 116 and moved through tunnel 140 as service equipment 110 can provide automated car wash services to the vehicle. Tunnel 140 can be part of car wash tunnel system 105 and can be accessed via lanes 134 and gates 160. Tunnel 140 can be configured to guide vehicles 130 through the car wash process based on instructions from car wash controller 104. Tunnel 140 can be communicatively coupled with car wash controller 104 and data processing system 118 to receive instructions for performing car wash operations.

Conveyor system 116 can include any combination of structures and pathways configured to transport vehicles 130 through tunnel 140 in car wash tunnel system 105. The conveyor system 116 can include conveyor belts, tracks, or rollers that move vehicles 130 through tunnel 140. Conveyor system 116 can be controlled by car wash controller 104 to execute car wash routines based on vehicle features and license plate information. For instance, a vehicle 130 identified by a license plate 132 can be coupled with conveyor system 116 and moved through tunnel 140 as service equipment 110 provides car wash services. Conveyor system 116 can be part of tunnel 140 and can be accessed via lanes 134 and gates 160. Conveyor system 116 can be configured to transport vehicles 130 through the car wash process based on instructions from car wash controller 104. Conveyor system 116 can be controlled by a car wash controller 104 allowing vehicles 130 from the queue 142 to enter the tunnel 140. For instance, a conveyor system 116 can be communicatively coupled with a car wash controller 104 or a data processing system 118 to receive instructions to allow vehicles 130 to access or enter the tunnel 140 to receive the services by the car wash tunnel system 105. The conveyor system 116 can include or be coupled with one or more processors that can control one or more components of the conveyor system 116, such as a conveyor belt. The one or more processors can execute one or more instructions to cause the conveyor system 116 to move or propagate a vehicle 130 through the tunnel 140. The conveyor system 116 can include a ramp onto which a vehicle can be driven. The conveyor system 116 can include a conveyor belt mechanism pulling, guiding or moving a vehicle 130 in response to an instruction that the vehicle 130 is to be propagated through the tunnel 140. This can be done, for example, in response to updates to the queue of the car wash tunnel system 105.

Vehicle 130 can include any type of vehicle that can receive services at facility 100. For example, vehicle 130 can be a car, truck, van, or a motorcycle. Vehicle 130 can be identified by a license plate 132 and can be directed through lanes 134 towards car wash tunnel system 105. For instance, a vehicle 130 identified by a license plate 132 can be coupled with conveyor system 116 and moved through tunnel 140 as service equipment 110 provides car wash services. Vehicle 130 can be monitored by gate cameras 120 and tunnel cameras 122 to capture images or videos of the vehicle and its license plate 132. Vehicle 130 can be part of queue 142 and can receive car wash services based on instructions from car wash controller 104. Vehicle 130 can be communicatively coupled with data processing system 118 to receive services according to the entity profiles associated with the vehicle.

License plate 132 can include any plate having a combination of characters or symbols to identify a vehicle 130. For example, a license plate 132 can include alphanumeric characters that uniquely identify a vehicle 130 from a plurality of other vehicles 130. License plate 132 can be captured by gate cameras 120 and tunnel cameras 122 and its characters can be used for identifying the account or profile associated with the vehicle 130. The profile or account identified based on the characteristics of the license plate 132 can identify user information, vehicle information or for instance, a vehicle 130 identified by a license plate 132 can be coupled with conveyor system 116 and moved through tunnel 140 as service equipment 110 provides car wash services. License plate 132 can be used by data processing system 118 to identify the vehicle profile and generate a car wash service request. License plate 132 can be part of the vehicle profile stored in data processing system 118. License plate 132 can be used to determine the identity of the vehicle 130 based on images captured by gate cameras 120 and tunnel cameras 122.

Gate camera 120 can include any combination of hardware and software for capturing images or videos of vehicles 130 and their license plates 132. For example, gate camera 120 can be positioned at the entrance of facility 100 to capture images of vehicles 130 as they approach or pass gates 160. Gate camera 120 can be directed towards region of interest 135, such as a portion of a lane 134 or an area of the lane 134 before a gate 160 barring the vehicle 130 from accessing the car wash tunnel system 105. The gate camera 120 can include a license plate recognition (LPR) camera, including for example at or near a traffic lane 134, at or near a tunnel 140 to facilitate in recognizing license plates 132. Gate camera 120 can be used to identify vehicle features (e.g., colors, shapes, sizes, add-ons or other structures) of vehicles 130 approaching or entering facility 100 or the car wash tunnel system 105. For instance, gate camera 120 can capture images of a vehicle 130 identified by a license plate 132 and transmit the images to data processing system 118. The data processing system 118 can process the images and manage the camera. Gate camera 120 can be communicatively coupled with data processing system 118 to provide images or videos of vehicles 130 and their license plates 132. Gate camera 120 can be used to monitor regions of interest 135 and capture images of vehicles 130 as they enter or merge from various lanes 134 into a queue 142. Gate camera 120 can be coupled with the network 101 of facility system 100 and can provide images for identifying the service to the operator devices 150 according to the entity profiles associated with vehicles 130.

Tunnel camera 122 can include any combination of hardware and software for capturing images or videos of vehicles 130 and their license plates 132 at or near an entrance of a tunnel 140 or within the tunnel 140. For example, tunnel camera 122 can be positioned or directed to a region of interest 135 at an entrance of a tunnel 140 (e.g., at an entrance to the car wash tunnel system 105 building or a structure). The tunnel camera 122 can include a license plate recognition (LPR) camera, including for example at or near a traffic lane 134, at or near a tunnel 140 to facilitate in recognizing license plates 132. The tunnel camera 122 can be positioned inside tunnel 140 to capture images of vehicles 130 as they pass through car wash tunnel system 105. Tunnel camera 122 can be used to identify the license plate 132 and vehicle features of vehicles 130 receiving car wash services. For instance, tunnel camera 122 can capture images of a vehicle 130 identified by a license plate 132 and transmit the images to the data processing system 118. The data processing system 118 can process the images and manage the camera. Tunnel camera 122 can be communicatively coupled with data processing system 118 to provide images or videos of vehicles 130 and their license plates 132. Tunnel camera 122 can be used to monitor the vehicles 130 forming the queue 142 as well as observe the car wash process and capture images of vehicles 130 as they move into or through the tunnel 140. Tunnel camera 122 can be coupled with the network 101 of facility system 100 and can provide images for identifying the service according to the entity profiles associated with vehicles 130.

Queue 142 can include any order or arrangements of vehicles 130 in a line leading into the tunnel 140 of the car wash tunnel system 105. For example, queue 142 can include an order or arrangement of a plurality of vehicles, one following the other, as the vehicles are lined up to enter the tunnel 140. The vehicles 130 can arrive to the queue 142 from lanes 134, as managed or permitted to access by the gates 160 tunnel 140. Queue 142 can be controlled by a data processing system 118 via a car wash controller 104 to manage the entry of vehicles 130 to the tunnel 140 using control of the gates 160. For instance, a vehicle 130 identified by a license plate 132 can be permitted to proceed to the queue 142 by controlling the gate 160 to allow the vehicle 130 to access the queue 142. The data processing system 118 can maintain the queue 142 representation (e.g., vehicle order) using images from the cameras 120 or 122. The queue 142 can be monitored by both the gate cameras 120 and tunnel cameras 122 to keep track of any changes to the queue 142, using features for recognizing license plates 132. Queue 142 can be maintained and managed by the data processing system 118 to ensure that each vehicle receives its own designated service.

Lanes 134 can include any combination of pathways and structures configured to direct vehicle traffic towards car wash tunnel system 105. For example, lanes 134 can include outdoor areas with pathways guiding vehicles 130 towards gates 160 and tunnel 140. Lanes 134 can be used to manage the flow of vehicles 130 arriving for service at facility 100. For instance, lanes 134 can include a first lane 134A guiding a first vehicle 130A identified by a first license plate 132A towards a first gate 160A. Lanes 134 can include a second lane 134B guiding a second vehicle 130B identified by a second license plate 132B towards a second gate 160B. Lanes 134 can include regions of interest 135 monitored by gate cameras 120 to capture images or videos of vehicles 130 as they approach or pass gates 160. Lanes 134 can be part of facility 100 and can be accessed via pathways and outdoor areas. Lanes 134 can be communicatively coupled with data processing system 118 to manage the flow of vehicles 130 towards the car wash tunnel system 105. It should be appreciated that lanes can include any pathway on which vehicles can move and the lanes may not be defined using barriers or other physical structures or demarcations. It should also be understood that the lanes may not directly guide or direct the vehicles.

Gates 160 can include any combination of structures and mechanisms configured to control the access of vehicles 130 to queue 142 and tunnel 140 in car wash tunnel system 105. For example, gates 160 can include barriers, turnstiles, visible indicators or lights, or electronic gates that regulate the entry of vehicles 130. Gates 160 can be controlled by car wash controller 104 to manage the access of vehicles 130 based on vehicle features and license plate information. For instance, a vehicle 130 identified by a license plate 132 can be allowed to pass through gate 160 and enter queue 142 based on instructions from car wash controller 104. The instructions can be generated based on a successful processing of a transaction by the third party server operating as a point of sale (POS) device for the facility 100. Gates 160 can be monitored by gate cameras 120 to capture images or videos of vehicles 130 as they approach or pass the gates. Gates 160 can be part of facility 100 and can be accessed via lanes 134 and pathways. Gates 160 can be communicatively coupled with data processing system 118 to control the access of vehicles 130 to queue 142 and tunnel 140 based on instructions from car wash controller 104.

Regions of interest 135 can include any areas and zones within facility 100 that are monitored or recorded by cameras, such as for capturing images or videos of vehicles 130. For example, regions of interest 135 can include areas near gates 160, lanes 134, and tunnel 140. Regions of interest 135 can be monitored by gate cameras 120 and tunnel cameras 122 to capture images or videos of vehicles 130 and their license plates 132. For instance, a region of interest 135A can be viewed by a gate camera 120A capturing images of a vehicle 130A identified by a license plate 132A as it approaches gate 160A. Regions of interest 135 can be used to identify vehicle features and license plate information for generating car wash service requests. Regions of interest 135 can be part of facility 100 and can be accessed via pathways and outdoor areas. Regions of interest 135 can be communicatively coupled with data processing system 118 to provide images or videos of vehicles 130 for identifying the service according to the entity profiles associated with the vehicles.

Data processing system 118 can include any combination of hardware and software for processing data and managing the operations of facility 100. Data processing system 118 can include one or more computing environments, servers, databases, and applications for storing and processing vehicle profiles, license plate information, and service requests. The data processing system 118 can be any computing device, collection of servers, data centers, among others, which include one or more processors coupled with memory storing instructions and data configured to implement or complete the tasks and processes described herein. The data processing system 118 can be electrically coupled to each of the components within the system 100 to control or monitor the reception and transmission of different data or signals within the service environment 100. The data processing system 118 can be deployed or provided within building or a structure housing the car wash tunnel system 105, or outside of it, such on a cloud based system, including a Software as a Service (Saas). The data processing system 118 can be connected to the devices 150 via the network 101 (e.g., the internet or a Wi-Fi network).

Data processing system 118 can be used to identify vehicle features and generate car wash service requests based on images captured by gate cameras 120 and tunnel cameras 122. Data processing system 118 can receive images of a vehicle 130 identified by a license plate 132 and generate a car wash service request based on the vehicle profile. Data processing system 118 can be communicatively coupled with car wash controller 104, gate cameras 120, tunnel cameras 122, operator devices 150, third party servers 164, and admin devices 162 via network 101. Data processing system 118 can manage the operations of facility 100 by processing data and providing instructions for performing car wash operations, including sending instructions to car wash controller 104 to adjust, manage or operate various services equipment 110. Data processing system 118 can ensure that the car wash service is performed according to the service request generated based on the entity profiles associated with the vehicles 130.

Admin device 162 can include any combination of hardware and software for providing administrative overview and services to the facility system 100 or any of its components (e.g., data processing system 118, operator devices 150. For example, admin device 162 can include computers, tablets, or smartphones used by administrators to monitor and manage the operations of facility 100. Admin device 162 can be used to access data processing system 118, car wash controller 104, and other components of facility 100. For instance, admin device 162 can be used to view images or videos captured by gate cameras 120 and tunnel cameras 122, monitor the status of queue 142, and manage the flow of vehicles 130 through lanes 134 and gates 160. Admin device 162 can be communicatively coupled with data processing system 118, operator devices 150, and third party servers 164 via network 101. Admin device 162 can provide administrative services such as updating vehicle profiles, generating reports, and managing entity profiles. Admin device 162 can ensure that the operations of facility 100 are performed efficiently and according to the service requests generated based on the entity profiles associated with the vehicles 130.

Third party servers 164 can include any combination of hardware and software for executing third party services, such as transactions or POS operations for the facility system 100. For example, third party servers 164 can include servers, databases, and applications used by third party service providers to process transaction operations (e.g., exchange and validate credit card payment data of drivers of the vehicles), manage entity profiles, and provide additional services. Third party servers 164 can be used to execute transaction operations based on the service requests generated by data processing system 118. For instance, third party servers 164 can process payments for car wash services provided to vehicles 130 identified by license plates 132. Third party servers 164 can be communicatively coupled with data processing system 118, operator devices 150, and admin devices 162 via network 101. Third party servers 164 can provide additional services such as loyalty programs, promotions, and customer support. Third party servers 164 can ensure that the transaction operations and additional services are performed according to the service requests generated based on the entity profiles associated with the vehicles 130.

Operator devices 150 can include any combination of hardware and software used by operators of the facility 100 to interact with the facility system 100. Operator devices 150 can include smartphones, tablets, laptops, or desktop computers operated by users, such as employees or service providers of the facility 100. Operator devices 150 can execute applications 152 that allow users to access services provided by facility 100, including scheduling car wash services, providing attention to entity accounts of the drivers of the vehicles 130 or managing vehicle data or gate access at gates 160. For example, a user (e.g., an operator) can use a mobile application executing on an operator device 150 to access a graphical user interface to review the state of the lanes 134 or to schedule a car wash service for a vehicle 130 identified by a license plate 132. Operator devices 150 can be communicatively coupled with data processing system 118, car wash controller 104, and third party servers 164 (e.g., POS devices) via one or more networks 101. Operator devices 150 can receive and display data from data processing system 118 or gate cameras 120 and tunnel cameras 122, including images or videos of the vehicles at various lanes 134 and display this data to the user via a graphical user interface (GUI) of the operator device 150. Operator devices 150 can transmit data to data processing system 118, such as service requests or updates to entity accounts. Operator devices 150 can provide users with a convenient way to access and manage the services or vehicle data utilized at the facility 100.

Applications 152 can include any combination of software programs executed on operator devices 150 to provide users (e.g., operators or employees of the facility) with access to the services of facility system 100. For example, applications 152 can include mobile applications, web applications, or desktop applications. Applications 152 can provide graphical user interfaces (GUIs) that allow users to interact with the services provided by facility 100. For instance, a mobile application 152 can present a GUI that displays data objects representing vehicles 130 in different lanes 134, including images and license plate information of the vehicles 130. Applications 152 can allow users to schedule car wash services, manage client accounts, and view the status of their vehicles 130. Applications 152 can be communicatively coupled with data processing system 118, car wash controller 104, and third party servers 164 via network 101. Applications 152 can receive data from data processing system 118, such as service requests or updates to vehicle profiles, and display this data to the user. Applications 152 can provide a GUI to the user to generate or select instructions, such as an instruction to open a gate 160, or provide notifications, such as a notification that a particular vehicle 130 in a particular lane 134 is receiving assistance for a pending issue. Applications 152 can provide users with a user-friendly interface to access and manage the services provided by facility 100.

Network 101 can include any combination of wired and wireless network types and connections for facilitating communication within facility system 100. For example, network 101 can include wired connections such as Ethernet cables, fiber optic cables, and coaxial cables to provide high-speed and reliable data transmission between components like data processing system 118, car wash controller 104, and third party servers 164. Network 101 can include wireless connections such as Wi-Fi, Bluetooth, and cellular networks to enable flexible and convenient communication with operator devices 150 and admin devices 162. For instance, Wi-Fi can be used to connect gate cameras 120 and tunnel cameras 122 to data processing system 118, allowing for real-time transmission of images and videos of vehicles 130 and their license plates 132. Network 101 can support various network protocols and standards to ensure seamless integration and interoperability between different components of facility system 100. Additionally, network 101 can provide secure and encrypted communication channels to protect sensitive data and ensure the privacy of client accounts associated with vehicles 130. By incorporating both wired and wireless connections, network 101 can offer a robust and versatile infrastructure for managing the operations of facility 100.

Figure 2:
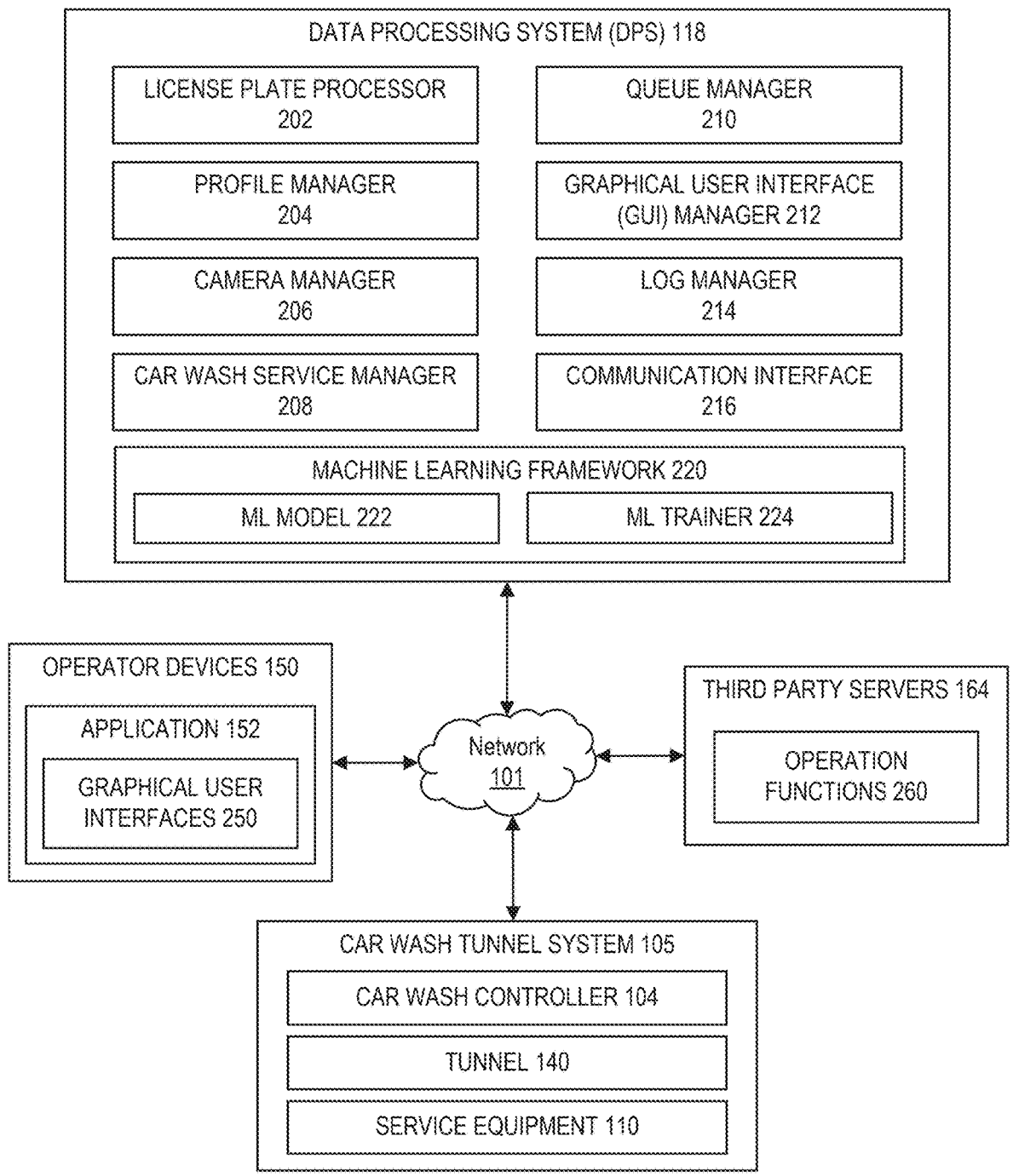
FIG. 2 is an example of a data processing system of the computing environment that can be used for implementing the technical solutions.

FIG. 2 illustrates an example system 200 for implementing the technical solutions of the facility system 100. The example system 200 can include a computing environment for implementing various functionalities of the technical solutions, such as automated vehicle license plate recognition, service facility queue adjustment based on a queue of a remote application, graphical user interface based management of vehicle lanes traffic at service facilities, or automated control of car wash services. The example system 200 can include one or more data processing systems 118, operator devices 150, third party servers 164 and car wash tunnel systems 105 that can be configured to communicate with each other via a network 101.

A data processing system 118 can include one or more of camera managers 206 to manage image capture devices, such as gate cameras 120 or tunnel cameras 122 to capture image or video data for processing by the data processing system. The data processing system 118 can include one or more of license plate processors 202 to apply image recognition to images captured by the cameras 120. A license plate processor 202 and a camera manager 206 can utilize machine learning to identify license plate characters or specific vehicle characteristics, as well as implement character replacement schema functionalities to utilize replacement characters to more reliably and efficiently identify license plates 132 for various vehicles 130.

The data processing system 118 can include one or more of profile managers 204 for managing profiles of vehicles or entities (e.g., data on vehicles and drivers), which can be used to facilitate automation of vehicle services customized for individual vehicles or drivers. The data processing system 118 can include one or more car wash service managers 208 for providing or managing car wash routines for different types of car wash services, based on the vehicle 130 (e.g., identified using a license plate processor 202) or entity profiles (e.g., data of the specific vehicle specifying car wash routines or preferences for the vehicle).

The data processing system 118 can include one or more queue managers 210 for monitoring or managing queues 142 (e.g., queues of the car wash tunnel system 105) to ensure that the designated vehicles 130 receive their intended and assigned services. A queue manager 210 can utilize machine learning and integrate with the license plate processor 202 and the camera manager 206 to track individual vehicles 130 at the facility and continuously update the vehicle queue to track the vehicles entering the tunnel 140 and maintain the order of their corresponding car wash routines.

The data processing system 118 can include one or more graphical user interface (GUI) managers 212 for managing graphical user interfaces (GU Is) 250 of the applications 152 executing on operator devices 150. The GUIs 250 can be configured to provide updated information on vehicles passing through the facility, including keeping track of vehicles 130 at the lanes 134 and facilitating timely and efficient management addressing of issues among the operators (e.g., facility staff) of the operator devices 150. The data processing system 118 can include one or more log managers 214 for generating and maintain logs or reports for the given services, as well as one or more communication interfaces 216 for facilitating interfacing or communication with other components of the system 200, such as via the network 101. The log manager 214 can log vehicle visits to the facility, maintain a series of videos or images of the vehicles 130 utilized during the visits and provide data on the vehicle over time. The data processing system 118 can include one or more machine learning (ML) frameworks 220 that can include one or more ML models 222 that can be trained by one or more ML trainers 224 to perform various tasks or operations of the data processing system components, such as for example license plate data recognition of a license plate processor 202 or vehicle identification for maintaining a queue of a queue manager 210.

An operator device 150 can be used by an operator (e.g., an employee of the facility) and execute one or more applications 152 having one or more GUIs 250 that can allow the operators to monitor the statuses of the lanes 134 or the vehicles 130 and timely address any pending issues. The issues may involve or relate to, for example, operation functions 260, such as POS transactions that can be executed via third party servers 164 (e.g., POS terminals) which the vehicle drivers may utilize to access or setup car wash services. The operation function 260 can include or provide operations for processing a credit card transaction or triggering a billing action of an account associated with the vehicle. The car wash tunnel system 105 can be controlled, managed, monitored or operated by the data processing system 118 or operator devices 150 to improve the system operation or facilitate the timely execution of operation functions 260.

ML framework 220 can include any combination of hardware and software for providing or implementing any type and form of ML or artificial intelligence (AI) functionalities of the data processing system. The M L framework 220 can manage and provide ML trainers 224 for training M L models 222 to perform functionalities of any of the components of the data processing system 118 (e.g., license plate processor 202, license plate data manager 426, camera manager 206, queue manager 210, or any other data processing system component or feature). For example, an ML framework 220 can utilize an ML trainer 224 to train an M L model 222 to detect, determine or identify license plate data or vehicle characteristics or features in order to identify vehicles. The ML trainers 224 can train the ML models 222 to detect updates in the order of vehicles in a queue entering a tunnel 140 of a car wash facility, thereby maintaining a correct representation of the order vehicles entering the car wash tunnel. ML models 222 can be trained to select or arrange one or more (e.g., a sequence of) car wash routines for implementing a particular (e.g., customized or desired) car wash service to the vehicle, based on the vehicle data or profile preferences.

The ML models 222 can include any combination of one or more neural networks, decision-making models, linear regression models, natural language models, random forests, classification models, generative AI models, reinforcement learning models, clustering models, neighbor models, decision trees, probabilistic models, classifier models, or other such models. For example, the models 222 include natural language processing (e.g., support vector machine (SVM), Bag of Words, Counter Vector, Word2Vec, k-nearest neighbors (KNN) classification, long short erm memory (LSTM)), object detection and image identification models (e.g., mask region-based convolutional neural network (R-CNN), CNN, single shot detector (SSD), deep learning CNN with Modified National Institute of Standards and Technology (M NIST), RNN based long short term memory (LSTM), Hidden Markov Models, You Only Look Once (YOLO), LayoutLM) (classification ad clustering models (e.g., random forest, XGB Boost, k-means clustering, DB Scan, isolation forests, segmented regression, sum of subsets 0/1 K napsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, data parser, conditional random field model, Bidirectional Encoder Representations from Transformers (BERT), among others.

The ML models 222 can include generative AI models, also referred to as generative AI models 222, which can include any machine learning systems configured to create new content, such as text, images, or audio, by learning patterns from the data stored in a storage or a database (e.g., training datasets). The generative AI models 222 can be trained using techniques, such as supervised learning, unsupervised learning, and reinforcement learning. Generative AI models 222 can utilize data set from the stored data to create logical inferences between various complex structures in the data set to generate coherent outputs for prompts input into the models 222.

The ML models 222 implemented as generative AI models can include any machine learning (ML) or artificial intelligence (AI) model designed to generate content or new content, such as text, images, or code, by learning patterns and structures from existing data. Such ML model 222 (e.g., a generative AI models) can include any model, a computational system or an algorithm that can learn patterns from data (e.g., chunks of data from various input images, videos, documents, computer code, templates, forms, etc.) and make predictions or perform tasks without being explicitly programmed to perform such tasks. The generative AI model 222 can include, utilize or refer to a large language model. The generative AI model 222 can be trained using a dataset of documents (e.g., text, images, videos, audio or other data). The generative AI model 222 can be designed to understand and extract relevant information from the dataset. The generative AI model 222 can leverage natural language processing techniques and pattern recognition to comprehend the context and intent of a prompt (e.g., one or more instructions), which can be used as input into the ML model 222 to trigger the desired output or result.

The ML model 222, including for example a generative AI model, can be designed, constructed, utilize or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feedforward neural networks). For example, each layer in the encoder and decoder can include a fully connected feed-forward network, applied independently to each position. The data processing system 118 can apply layer normalization to the output of the attention and feed-forward sub-layers to stabilize and improve the speed with which the generative AI model 222 is trained. The data processing system 118 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, ML trainers 224 can include any combination of hardware and software for training ML models 222. ML trainers 224 can use datasets including images, videos, documents or character strings to identify, detect or monitor license plate data, vehicle data, user data, vehicle queues or any other set of information handled by the data processing system 118. Through training, a generative ML model 222, also referred to as a generative AI model 222, can learn or adjust its understanding of mapping embeddings to particular issues (e.g., vehicle features or characteristics identified via images), by adjusting its internal parameters. For example, the model 222 can be trained using datasets comprising vehicle or license plate data. The internal parameters can include numerical values of a generative AI model that the model learns and adjusts during training to optimize its performance and make more accurate predictions. Such training can include iteratively presenting the various data chunks or documents of the dataset (e.g., or their chunks, embeddings) to the generative AI model 222, comparing its predictions with the known correct answers, and updating the model's parameters to minimize the prediction errors. By learning from the embeddings of the dataset data chunks, the generative AI model 222 can gain the ability to generalize its knowledge and make accurate predictions or provide relevant insights when presented with prompts.

Figure 3:
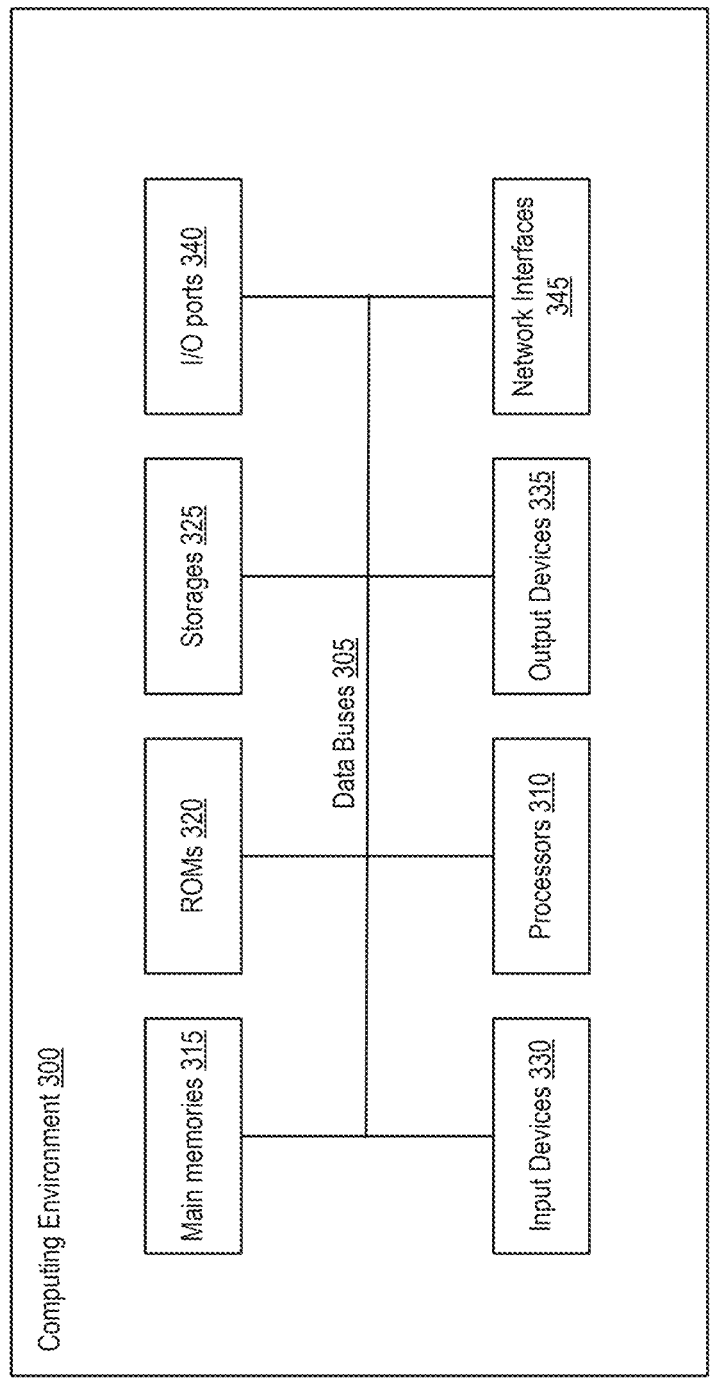
FIG. 3 is an example block diagram of a computing environment in which the data processing system and the features of the technical solutions can be implemented.

FIG. 3 illustrates an example block diagram of a computing environment 300, also referred to as a computing or a computer system 300, using which any of the computational components of the example systems 100 or 200 can be implemented. For instance, the computing environment 300 can be utilized to implement or execute any portion of a data processing system 118, an operator device 150, a third party server 164 or a car wash tunnel system 105. Computer system 300 can include or be used to implement any computation or processing (e.g., operation, command, protocol, or data processing) described herein, including any component of a data processing system 118. For instance, instructions, computer code or data stored in memories of the computing system 300 (e.g., 315, 320 or 325) can be utilized to configure processors of the computing system (e.g., 310) to execute any of the functionalities of the data processing system 118 described herein.

Computing system 300 can include at least one bus data bus 305 or other communication component for communicating information and at least one processor 310 or processing circuit coupled to the data bus 305 for processing information. Computing system 300 can include one or more processors 310 or processing circuits coupled to the data bus 305 for exchanging or processing data or information. The processors 310 can include any processing circuitry, including, for example, graphics processing units (GPUs) or any circuitry or processors configured for executing machine learning or artificial intelligence models. Computing system 300 can include one or more main memories 315, such as a random-access memory (RAM), dynamic RAM (DRAM) or other dynamic storage device, which can be coupled to the data bus 305 for storing information and instructions to be executed by the processor(s) 310. Main memory 315 can be used for storing information (e.g., data, computer code, commands, or instructions) during execution of instructions by the processor(s) 310.

Computing system 300 can include one or more read only memories (ROM s) 320 or other static storage device coupled to the bus 305 for storing static information and instructions for the processor(s) 310. Storage 325 can include any storage device, such as a solid-state device, magnetic disk, or optical disk, which can be coupled to the data bus 305 to persistently store information and instructions. Storage 325 can be used, for example, to provide data repositories.

Computing system 300 may be coupled via the data bus 305 to one or more output devices 335, such as speakers or displays (e.g., liquid crystal display or active-matrix display) for displaying or providing information to a user. Input devices 330, such as keyboards, touch screens or voice interfaces, can be coupled to the data bus 305 for communicating information and commands to the processor(s) 310. Input device 330 can include, for example, a touch screen display (e.g., output device 335). Input device 330 can include a cursor control, such as a mouse, a trackball, or cursor direction keys, for communicating direction information and command selections to the processor(s) 310 for controlling cursor movement on a display.

Computer system 300 can include input/output ports 340, also referred to as I/O ports 340, can include physical interfaces that facilitate or provide communication between external or peripheral devices and processor(s) 310 and/or memory 315. I/O ports 340 can be connected to data bus 305, allowing the transfer of data between the processor(s) 310, memories 315, and any external devices (e.g., keyboards, mice, printers, and external storage devices). Computer system 300 can include one or more network interfaces 345 coupled via data buses 305. Network interfaces 345 can include any physical or virtual components enabling communication between the computer system 300 and any external networks (e.g., the Internet). Network interface 345 can provide transfer of data between the processor(s) 310, memories 315 and any external networks.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors 310 in a multi-processing arrangement may also be employed to execute the instructions contained in main memory 315. Hard-wired circuitry can be used in place of or in combination with software instructions together with the systems and methods described herein, describes systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

B. Systems and Methods for Automated Car Wash Facility Throughput Control

When a vehicle 130 enters a region of interest 135 within a proximity of a gate 160 in a lane 134 of a multi-lane facility 100, the technical solutions can utilize a gate camera 120 to capture one or more images or video streams of the vehicle 130. Once captured, a queue management system can analyze the visual data to extract vehicle information, such as a make, model, type, and license plate number of the vehicle 130. Once the data is collected, the queue management system can update a system queue to include the vehicle 130, and generate a first data object for display on an operator device. The data can indicate a status of the lane 134, such as position, presence, absence or operation of the vehicle 130 in the lane 134. Without the queue management system, an operator may need to manually input the vehicle information, update the system queue, and send the vehicle 130 to a car wash tunnel controller for services to be provided to the vehicle 130. Such cases may involve service delays, disruptions, and the car wash tunnel system 105 not actuating the gate 160, thereby not allowing the vehicle 130 into the tunnel to receive car wash services. Moreover, without the queue management system, the operator may need to be stationary to monitor and identify issues with vehicles at the service facility, leading to inefficient operations and resource management of the service facility 100.

To overcome this challenge, the technical solutions can detect and update a system queue, thereby improving the efficiency of the car wash tunnel system. In particular, the technical solutions can provide a queue manager to maintain a queue of vehicles being serviced by a facility, as well as poll a car wash tunnel system controller to determine a status of a tunnel queue. Based on the status, the queue manager can transmit instructions to update the tunnel queue with vehicle information, thereby enabling continuous, automatic updates to the tunnel queue and minimizing service disruptions of the car wash tunnel system. In conjunction, the technical solutions can provide a data object generator to generate objects for display on a mobile application of the operator device, representing different vehicles in different lanes. The mobile application can allow an operator to control the traffic flow within the car wash tunnel system, track the vehicles in each of the lanes, and monitor services to be provided to each of the vehicles. The mobile application can allow the operator to efficiently identify vehicles in need of assistance and provide assistance to the vehicles.

Moreover, as different vehicles utilize different lanes of a multi-lane facility to seek different services from the facility, it can be challenging for operators to timely and efficiently keep track of statuses of the vehicles at each of the lanes and provide service. As different vehicles may face different issues at different lanes in the course of seeking services, it can be a challenge for the operators to know the status of the vehicles at each of the lanes in real time. For example, a vehicle in one lane may encounter an issue with a transaction process regarding a particular selected service, and may be waiting for operator assistance, while another vehicle in a different lane may be undergoing a different stage of service (e.g., selecting a type of car wash to order) and may not be seeking operator assistance. In such scenarios, it may be challenging for operators of the facility to know which vehicle operators at which lanes are encountering issues and to which lanes to provide operator assistance. Delays created by such challenges can lead to wasted system energy and resources as well as adversely impact the user experience.

The technical solutions of this disclosure can overcome such challenges by providing a mobile application with a user interface presenting the facility operators with a real time multi-lane status visibility. The user interface of the application can provide a representation of statuses of multiple lanes of the facility based on the data corresponding to the vehicles identified at the respective lanes. The system can generate, based on the data, data objects for different portions of the user interface to represent the updated status of the lanes for the user interface. The system can make determinations when vehicle presence at the lanes change (e.g., when one vehicle moves towards the facility and the lane is occupied by a next vehicle). The system can update the data objects for different portions of the user interface, thereby efficiently and reliably updating the lane statuses (e.g., informing the operators of any issues faced by the vehicle operators seeking operator assistance) at any given lane. The user interface can allow the operators of the application to take action, such as control (e.g., open or close) facility features such as gates, allowing for more efficient movement of the vehicles. In doing so, the technical solutions can facilitate conserving energy and resources of the facility system, improving both the system energy and resource efficiency and the user experience. The application can further integrate with the queue system to allow for monitoring and updating of the facility system queue, via the application.

Figure 4:
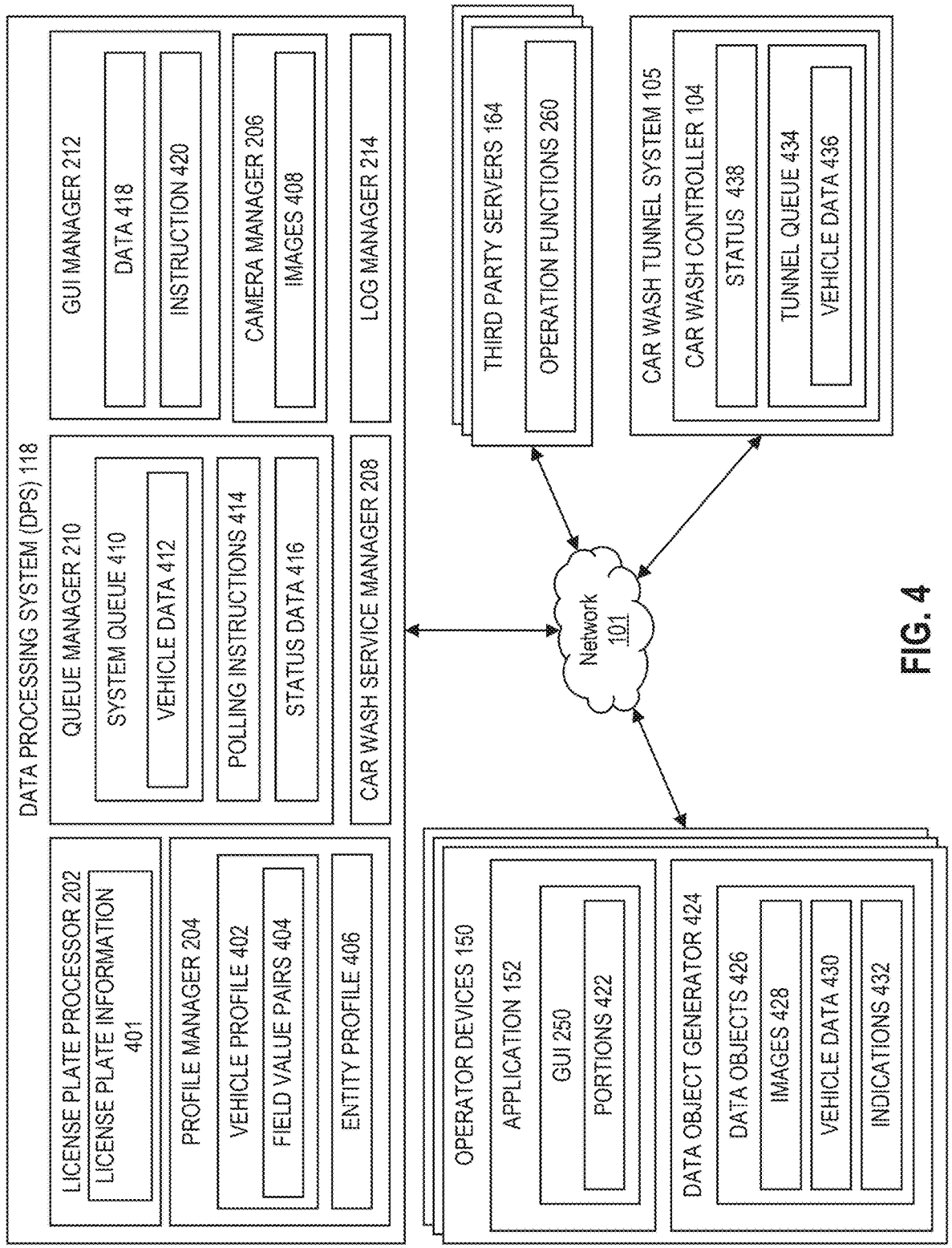
FIG. 4 is an example block diagram of a system for automated car wash facility throughput control.

FIG. 4 illustrates an example system 400 for implementing the technical solutions of the facility system 100 for tracking vehicles and updating a facility system queue and providing an application user interface for multi-lane status monitoring. The example system 400 can include a system for implementing automated vehicle traffic flow management features for use at service facilities, such as a car wash. The automated vehicle traffic flow management features can include, for example, queue systems for providing an automated car wash facility throughput control. The automated vehicle traffic flow management features can include graphical user interface (GUI) systems for providing facility operators with updates on statuses and issues of various vehicles at different facility lanes and various lane points, such as lane gates.

The example system 400 for providing automated vehicle traffic flow management features can include one or more data processing systems 118, one or more operator devices 150, one or more third party servers 164, and one or more car wash tunnel systems 105 which can be integrated using any combination of one or more instances of the system 200 of FIG. 2 or the system 300 of FIG. 3, in the context of a facility 100 of FIG. 1. At least one of the data processing system 118, the operator device 150, or the third party server 164 can use one or more ML models 222 to perform one or more operations of the data processing system 118.

The data processing system 118 can include one or more license plate processors 202 for capturing and processing license plate information 401, such as a license plate number of vehicle license plates 132. The data processing system 118 can include one or more profile managers 204 which can include one or more databases storing one or more vehicle profiles 402 for one or more vehicles 130. Each vehicle profile 402 can include various vehicle data, such as field value pairs 404 (e.g., make and model of vehicle, license plate and license plate number of vehicle). The one or more databases can store one or more entity profiles 406 for one or more vehicles 130. The one or more entity profiles 406 can include various driver data, such as payment information and name. The data processing system 118 can include one or more camera managers 206 communicatively coupled to at least the one or more gate cameras 120. The camera manager 206 can capture and determine one or more images 408 (e.g., images of the vehicle 130). The data processing system 118 can include one or more car wash service managers 208 providing services (e.g., car washes) to the vehicle 130. The data processing system 118 can include one or more queue managers 210 to manage and monitor queues of the facility 100. The queue manager 210 can include a system queue 410 (e.g., queue of vehicles 130), and the system queue 410 can include various vehicle information, such as vehicle data 412 (e.g., vehicle type, license plate information). The queue manager 210 can include polling instructions 414 (e.g., to transmit to the car wash controller 104) and status data 416 (e.g., status of a queue stored in the car wash controller 104). The data processing system 118 can include one or more GUI managers 212 to generate GU Is for display on a device. The GUI manager 212 can include various information, such as data 418 (e.g., vehicle data), and one or more instructions 420 (e.g., regarding presentation of the data 418 on the device). The data processing system 118 can include one or more log managers 214 for storing logs (e.g., databases) associated with various information, such as the vehicle profile 402 and the entity profile 406. The log manager 214 can log vehicle visits to the facility, maintain a series of videos or images of the vehicles 130 utilized during the visits and provide data on the vehicle over time.

The operator devices 150 can include one or more applications 152. The one or more applications 152 can include one or more GUIs 250 including one or more portions 422 (e.g., portions of the GUI 250). The operator devices 150 can include one or more data object generators 424 to generate data objects for display on at least the GUI 250. The data object generator 424 can receive data 418 and instruction 420 from the GUI manager 212. The data object generator 424 can include one or more data objects 426. The one or more data objects 426 can include various information, such as one or more images 428 (e.g., images of the vehicle 130), one or more vehicle data 430 (e.g., license plate information), and one or more indications 432 (e.g., to indicate whether a lane of the facility 100 is occupied or empty). The third party servers 164 can include one or more operation functions 260 to perform operations related to at least the entity profile 406. For example, the operation function 260 can include a point of sale transaction, such as an operation for processing a credit card transaction or triggering a billing action of an account associated with the vehicle. The car wash tunnel system 105 can include one or more car wash controllers 104. The car wash controller 104 can include various vehicle information, such as one or more tunnel queues 434 (e.g., queue including one vehicle), vehicle data 436 (e.g., type of vehicle, service to be provided to vehicle), and one or more statuses 438 (e.g., status of the tunnel queue 434).

The license plate processor 202 can process and determine license plate information 401. The license plate information 401 can include a license plate number (e.g., sequence of characters) and registration of the license plate 132 of the vehicle 130. The license plate processor 202 can receive the images 408 from the camera manager 206 to process and determine the license plate information 401. For example, the license plate processor 202 can include one or more M L models 222, such as an optical character recognition (OCR) model, and input the images 408 into the M L model 222. The ML model 222 can output the license plate information 401. The license plate processor 202 can transform the license plate information on the license plate 132 in the image 408 into computer-readable license plate information 401.

In some implementations, the license plate processor 202 can process and encode the images 408 to determine the license plate information 401. For example, the ML model 222 can include a character replacement schema, and can determine the license plate information 401 by receiving the images 408, and replacing characters on the license plate 132. Replacing the characters can improve a recognition capability of the license plate processor 202 in scenarios where the license plate information 401 is hard to detect, for example, when the license plate 132 is dirty or deformed. The ML model 222 can accommodate inconsistencies of the license plate 132 and determine the license plate information 401 using the character replacement schema. For example, the ML model 222 replaces "O" with "0." As such, the license plate information 401 can be different than a license plate number of the license plate 132 and instead, can be an alternative license plate number for the vehicle 130.

In some implementation, instead of, or in conjunction with, generating the replacement character sequence 432, the license plate data manager 426 can utilize information stored in the vehicle profile 402 to identify a vehicle 130 (e.g., within the region of interest 135). For example, the license plate data manager 426 can receive the original character sequence 424 from the license plate processor 202, and compare the original character sequence 424 to the license plate information 401 stored in the vehicle profiles 402. Upon determining that the original character sequence 424 is different from each license plate number (e.g., license plate character sequence) in the license plate information 401, the license plate data manager 426 can shorten the original character sequence 424. For example, a last character in the original character sequence 424 can be removed such that a length of the original character sequence 424 is adjusted from 6 characters to 5 characters. The license plate data manager 426 can compare the shortened original character sequence 424 with the license plate information 401. The license plate data manager 426 can include and utilize a character sequence length threshold. The character sequence length threshold can indicate a minimum length of the shortened original character sequence 424, such as 4. For example, if the license plate data manager 426 shortens the shortened original character sequence 424 to 4 and the shortened original character sequence 424 remains different from the license plate information 401, the license plate data manager 426 compares the original character sequence 424 to the character replacement schema 428 to identify the vehicle 130.

In some implementations, the original character sequence 424 matches the license plate number in one vehicle profile 402. In such cases, the license plate data manager 426 can determine that the one vehicle profile 402 corresponds to the vehicle 130. For instance, license plate recognition system can utilize a positional search methodology. This can include configuring a positional search with a minimum starting sequence, such as four characters, to improve the accuracy of license plate matches. For instance, when a camera scans a plate with the value "ABC123," the system can first check the database for an exact match. If no exact match is found, the system can perform positional searches by progressively reducing the number of characters, starting with "ABC12", then "BC12" and so on. This reduction of characters can allow the system to identify potential matches even when the exact plate number is not available, thereby increasing the recognition and decreasing the chance of false negatives.

The positional searching can incorporate utilization, processing and evaluation of metadata to further refine the search results and improve the reliability of the recognitions. Metadata utilized can include, for example, plate region, vehicle color, make, model, and type, each of which can be considered during the search process and determining of the vehicle identity. For example, if the initial search for "ABC123" returns no results, the system can perform a positional search for "ABC12," which may yield several results. These results can be ranked based on the metadata, with higher weight given to matches in the plate region, followed by vehicle color, make, and type. This ranking technique can allow for the most relevant matches to be prioritized, improving the overall accuracy and reliability of the license plate recognition system.

For example, a camera can scan a plate with the value "ABC123" in the region VA, and the vehicle can be a white Chevrolet Silverado pickup. The system can perform a search for license plate data using the initial search for "ABC123", resulting in no results. In response to receiving no results, the data processing system can then proceed to implement a positional search using a portion of the license plate (e.g., subset of the characters) as the input. In such a step, the data processing system can determine that for "ABC12" there may be several matches, including "ABC12E", "ABC125", and "ABC122" of the same state or country. The data processing system can then have each of these matches ranked based on the metadata corresponding to the vehicle data of each of these license plates. For instance, "ABC12E" can receive the highest score due to matching the region (e.g., state), make, color, and vehicle type, thereby being identified as the most likely result. This refined search process can improve the system's ability to accurately recognize license plates, even in cases where the exact plate number is not available. In another example, upon determining that the shortened original character sequence 424 is the same as at least one license plate number in the license plate information 401, the license plate data manager 426 receives the vehicle characteristic 418 from the camera manager 206 based on the images 416. The vehicle characteristic 418 can include at least one of a region of the license plate 132 (e.g., state), color, make, model, or type (e.g., metadata) of the vehicle 130. Once received, the license plate data manager 426 can compare the vehicle characteristic 418 to at least one of the license plate information 401 and the vehicle data 412 stored in the vehicle profiles 402. For example, the license plate data manager 426 compares the region of the license plate 132 of the vehicle 130 in the images 416 to regions in the license plate information 401 to identify the vehicle profile 402 associated with the vehicle 130. The license plate data manager 426 compares the vehicle characteristic 418 to data stored in the vehicle profiles 402 with the vehicle profiles 402 matching the shortened original character sequence 424. The license plate data manager 426 can include weights with the vehicle characteristic 418 for comparing the vehicle 130 to the vehicle profiles 402. For example, a weight of the region of the license plate 132 can be higher than a weight of the color, make, model, or type. The license plate data manager 426 identifies a match percentage between the vehicle characteristic 418 and the vehicle profiles 402, and determines the vehicle profile 402 corresponding to the vehicle 130 based on a highest match percentage. For example, the license plate data manager 426 determines a difference between each of the region, make, model, color, and type of the vehicle 130 with the region, make, model, color, and type of vehicle stored in each of the vehicle profiles 402, weighs the differences, and determines the match percentage for each of the vehicle profiles 402 with the vehicle 130 based on the weighted difference.

The profile manager 204 can store and provide various vehicle profiles 402. A vehicle profile 402 can include various vehicle data. For example, the vehicle profile 402 can include field value pairs 404. The field value pairs 404 can relate (e.g., correlate) various vehicle data related to the vehicle 130. For example, the field value pairs 404 include at least one of the license plate 132 and a series of characters of the license plate 132 of the vehicle 130 (e.g., license plate information 401), a vehicle type (e.g., sedan, truck) and a make and model information of the vehicle 130, a vehicle color information (e.g., gray) and a name of a color of the vehicle 130 (e.g., specific color of the make of the vehicle 130). In some implementations, the vehicle profile 402 can include the various vehicle data, and the various vehicle data is tagged (e.g., marked, associated) to form (e.g., indicate) the field value pairs 404. The profile manager 204 can detect and extract vehicle profiles 402 based on the license plate information 401 provided by the license plate processor 202. For example, the profile manager 204 can match the license plate information 401 to at least one field value pair 404.

The profile manager 204 can store and provide various entity profiles 406. An entity profile 406 can include various driver data. For example, the entity profile 406 can include a name, address, payment information, and subscription information of the driver of the vehicle 130. The subscription information can include a car wash type, a total number of car washes, and a number of remaining car washes. The subscription information can include a time interval between car washes, and a time duration to receive the number of remaining car washes. For example, the subscription information can indicate a time limit for which the total number of car washes can be received. Each entity profile 406 can be associated with (e.g., corresponds to) at least one vehicle profile 402. For example, the name of the driver is included in both the entity profile 406 and the vehicle profile 402, and is used to associate the entity profile 406 and the vehicle profile 402. In some implementations, the entity profile 406 includes one or more vehicle profiles 402. For example, one entity profile 406 can be associated with three vehicle profiles 402 (e.g., driver has a subscription for three vehicles 130).

The camera manager 206 can capture and store various images 408. The camera manager 206 can be communicatively coupled with at least one image capture device, such as the gate cameras 120 and the tunnel camera 122. The tunnel camera 122 can be positioned at an entrance of the tunnel 140. The camera manager 206 can monitor the entrance of the tunnel 140 using the tunnel camera 122, and can instruct the tunnel camera 122 to capture the images 408 of the vehicle 130 upon detection of the vehicle 130 at the entrance of the tunnel 140. The camera manager 206 can then receive and store the images 408. The camera manager 206 can receive the images 408 from at least one of the gate cameras 120 or the tunnel camera 122. In some implementations, the camera manager 206 can continually receive images 408 from the tunnel camera 122. The camera manager 206 can receive and store images 408 from the gate cameras 120 of vehicle 130 in at least one lane 134. The camera manager 206 can receive and store images 408 of the gate cameras 120 of the vehicle 130 in the region of interest 135.

Based on the images 408, the camera manager 206 can identify various vehicle information. For example, the camera manager 206 can identify one or more features of the vehicle 130 from the images 408. The features of the vehicle 130 can include elements on a roof of the vehicle 130 (e.g., roof rack), a tire type, height, width, or color of the vehicle 130, among others. The camera manager 206 can include the ML model 222 to identify the features. For example, the camera manager 206 can input the images 408 into the ML model 222, which can be an object detection model, and the ML model 222 can output the features. The camera manager 206 can store the features of the vehicle 130 in a log of the log manager 214 and/or in a respective vehicle profile 402. For example, the camera manager 206 can provide the images 408 to the license plate processor 202. Upon extraction of the license plate information 401, the profile manager 204 can provide a matching vehicle profile 402, and the camera manager 206 can provide the features to the profile manager 204 to store in the matching vehicle profile 402.

The car wash service manager 208 can identify and transmit instructions to the car wash controller 104 to provide services to the vehicle 130. For example, the vehicle data 436 of the tunnel queue 434 and the vehicle data 412 of the system queue 410 can include information identifying a service (e.g., information associated with a car wash service) to be provided to at least one vehicle 130 by the car wash tunnel system 105. The service can include a car wash type, a car wash routine, etc. For example, the service can be a "platinum car wash," which can include an underbody wash, a tire shine, and wax services. The service can indicate a service setting, such as a temperature and duration of the service. The car wash controller 104 can be configured to control one or more components of the car wash tunnel system 105 according to the service. For example, responsive to the service including the underbody wash, the car wash service manager 208 can transmit instructions to the car wash controller 104 to actuate the service equipment 110 configured to provide the underbody wash to the vehicle 130.

In some implementations, the camera manager 206 provides features of the vehicle 130 to the car wash service manager 208. In some implementations, the car wash service manager 208 extracts the features of the vehicle 130 from a respective vehicle profile 402. Based on the features, the car wash service manager 208 can instruct the car wash controller 104 to actuate a subset of components (e.g., service equipment 110) of the car wash tunnel system 105. For example, responsive to the features of the vehicle 130 including a roof rack, the car wash service manager 208 can instruct the car wash controller 104 to not actuate brush rollers (e.g., of the service equipment 110) for a roof of the vehicle 130. As another example, based on a height and width of the vehicle 130, the car wash service manager 208 can instruct the car wash controller 104 to deploy a subset of the service equipment 110 configured for the height and width of the vehicle 130. The car wash service manager 208 can include the M L model 222 to determine which subset of components to actuate based on the features of the vehicle 130.

The queue manager 210 can monitor, store, and update various queues of vehicles 130. For example, the queue manager 210 maintains a system queue 410. The system queue 410 can include various vehicle data 412, such as vehicle data 412 of a first vehicle 130 and a second vehicle 130. The vehicle data 412 can include a service to be provided, license plate information 401, a type, make, model, or features of the first vehicle 130 and the second vehicle 130, among others. The queue manager 210 can receive the vehicle data 412 from the profile manager 204 upon identification of the vehicle profile 402 based on the license plate information 401 from the images 408. The system queue 410 can maintain an order of the vehicles 130. For example, the second vehicle 130 is behind the first vehicle 130, and receives services in the tunnel 140 after the first vehicle 130. In some implementations, the queue manager 210 can receive the images 408 from the camera manager 206, and update the order of the system queue 410 using the one or more images 408. For example, the images 408 can show that the second vehicle 130 is in front of the first vehicle 130, and the queue manager 210 can update the order of the system queue 410 accordingly.

The queue manager 210 can include the M L model 222 which can determine discrepancies between the system queue 410 and the one or more images 408, and update the order of the system queue 410. The queue manager 210 can update the order of the system queue 410 based on images 408 received from the tunnel camera 122. The images 408 can indicate a queue of vehicles 130 between the tunnel 140 and the gates 160. The queue manager 210 can update the system queue 410 according to the images 408 to ensure each vehicle 130 receives the service indicated in a respective vehicle profile 402. For example, the queue manager 210 can determine that license plate information 401 of a first vehicle 130 in the system queue 410 at a first position matches license plate information 401 of a second vehicle 130 in the queue of vehicles 130 at a second position between the tunnel 140 and the gates 160. The queue manager 210 can then update the system queue 410 to have the first vehicle 130 at a second position of the system queue 410.

The queue manager 210 can include polling instructions 414. The queue manager 210 can be communicatively coupled to the car wash controller 104, and transmit polling instructions 414 to the car wash controller 104. The polling instructions 414 can include one or more requests for the car wash tunnel system 105 to provide to the data processing system 118 the latest or the most recently updated status or a state of a vehicle 130 at the tunnel queue 434. For instance, the polling instruction 414 can request information on whether the vehicle 130 at the tunnel queue 434 has left the queue and entered the tunnel or is still waiting to enter the tunnel. Queue manager 210 can send the polling instructions 414 in order to provide a vehicle data 412 about a next vehicle to enter the tunnel queue 434 from the system queue 410 that maintains information about a plurality of vehicles about to enter the tunnel queue 434.

The polling instructions 414 can include instructions to add information about a vehicle 130 into the tunnel queue 434 maintained by the car wash controller 104. The information can include the vehicle data 412 from the system queue 410 on a vehicle 130, such as a vehicle at the tunnel queue 434 or a vehicle about to enter the tunnel queue 434. In some implementations, the tunnel queue 434 is configured to hold vehicle data 436 for only a single vehicle 130. For example, the tunnel queue 434 only maintains the information about the single vehicle 130 in the tunnel queue 434. The vehicle data 436 can include vehicle data 412 for a single vehicle 130 provided by the queue manager 210. Once the vehicle 130 is permitted to enter the tunnel 140, the car wash controller 104 can erase (e.g., remove) the vehicle data 436 from the tunnel queue 434, and can repopulate the tunnel queue 434 with the vehicle data 436 upon receival of a subsequent vehicle data 412 from the queue manager 210. The vehicle data 436 can be equivalent to the vehicle data 412 transmitted by the queue manager 210, and can be continually refreshed (e.g., changed) as vehicles 130 enter the tunnel 140, and the queue manager 210 sends additional vehicle data 412 to the car wash controller 104.

In some implementations, the instructions to add information about the vehicle 130 can include an enter queue command provided over a serial connection. For example, the queue manager 210 (e.g., the data processing system 118) can be connected to the car wash controller 104 via at least one cable, and transmit the polling instructions 414 through the cable. The enter queue command can indicate to the car wash controller 104 to input (e.g., enter) the vehicle data 412 into the tunnel queue 434. As another example, the data processing system 118 is communicatively coupled to the car wash controller 104. In these cases, at least one of the car wash controller 104 or the queue manager 210 can include a virtual serial port to provide the instructions over the serial connection.

Responsive to receiving the polling instructions 414, the car wash controller 104 can update the status 438 of the tunnel queue 434. The status 438 can indicate whether the tunnel queue 434 can receive additional instructions (e.g., empty, available), or whether the tunnel queue 434 is at capacity (e.g., full, unavailable). For example, responsive to receiving the polling instructions 414 and the tunnel queue 434 including the vehicle data 436, the status 438 is updated to full. Responsive to sending the vehicle 130 into the tunnel 140, the status 438 can be updated to empty. Responsive to transmitting the polling instructions 414 to add information about the vehicle 130, the car wash controller 104 can update the system queue 410. For example, the second vehicle 130 is moved to a first spot in the system queue 410 (e.g., first spot previously occupied by the first vehicle 130).

Once the vehicle 130 is in the tunnel queue 434, the car wash controller 104 can permit the vehicle 130 into the tunnel 140. For example, the car wash controller 104 actuates the gate 160, and initiates the service equipment 110 to provide the car wash to the vehicle 130 in the tunnel 140. The car wash controller 104 can permit entry of the vehicle 130 into the tunnel 140. The car wash controller 104 can provide the car wash service to the vehicle 130 based on at least the vehicle data 436. Once the vehicle 130 is permitted into the tunnel 140, the queue manager 210 can update the status 438 to be empty. At this time, the tunnel queue 434 can be empty (e.g., not include the vehicle data 436).

The queue manager 210 can poll (e.g., survey, examine) the car wash controller 104 to determine a change in the status 438 of the tunnel queue 434. The polling can include sending requests for most recently updated status of a vehicle in a tunnel queue (e.g., whether a vehicle is waiting to be released, moved or allowed to move into the tunnel or is waiting for approval). The queue manager 210 can receive the status 438, and can compare the status 438 with a previously received status 438 to determine the change in the status 438. The change in the status 438 can indicate that the tunnel queue 434 is either available or unavailable. For example, the queue manager 210 can determine that the status 438 has changed from unavailable to available, and the change in the status 438 can be indicated as positive. The polling of the car wash controller 104 can be implemented over a serial connection. For example, using the same cable used to transmit the polling instructions 414, the queue manager 210 can poll the car wash controller 104 to determine the status 438. Polling the car wash controller 104 to determine the status 438 can be included in the polling instructions 414. The polling instructions 414 can include a sequence (e.g., plurality) of requests for the status 438 of the tunnel queue 434. The sequence of requests can be continuously transmitted over the serial connection. The sequence of requests can be transmitted according to a predefined time period (e.g., duration). For example, the queue manager 210 can transmit the sequence of requests at time intervals according to the predefined time period. As another example, the queue manager 210 can transmit the sequence of requests for a predefined time period at predefined time intervals.

In some implementations, to poll the car wash controller 104, the queue manager 210 emulates (e.g., imitates, copies) a keypad of the car wash controller 104 to transmit a command for polling. For example, the queue manager 210 can mimic behavior of a physical keypad of the car wash controller 104 through any combination of hardware or software, and can include key pressing, such as using a microcontroller to send signals mimicking keypad presses. The queue manager 210 can transmit the command using the sequence of requests to refresh and determine the status 438 of the tunnel queue 434. In some implementations, the queue manager 210 polls the car wash controller 104 responsive to receiving a signal from, for example, the GUI manager 212. The signal can be generated by the GUI manager 212 in response to a selection on the GUI 250. For example, the GUI 250 can include a portion 422 that includes, for example, a button enabling a user (e.g., operator) of the operator device 150 to determine the status 438. Responsive to the user interacting with (e.g., selecting, touching) the portion 422, the GUI manager 212 generates a signal and transmits the signal to the queue manager 210 to poll the car wash controller 104 to determine the status 438. Once the status 438 is determined, the car wash controller 104 can transmit the status 438 to the GUI manager 212 for display on the GUI 250.

After determining the change in the status 438, the queue manager 210 can determine that the tunnel queue 434 is available or unavailable (e.g., empty) to receive a next vehicle 130 (e.g., the second vehicle 130). Responsive to determining that the tunnel queue 434 is unavailable, the queue manager 210 can continue to poll the car wash controller 104 to determine the change in the status 438. Responsive to determining that the tunnel queue 434 is available, the queue manager 210 can transmit another instruction (e.g., second instruction) to the car wash controller 104 to add information (e.g., vehicle data 412) about the second vehicle 130 (e.g., the next vehicle 130 in the system queue 410 according to the order). The car wash controller 104 can receive the vehicle data 412 of the second vehicle 130, and add the vehicle data 412 to the tunnel queue 434 as the vehicle data 436. Upon the addition of the vehicle data 436 to the tunnel queue 434, the car wash controller 104 can permit the vehicle 130 to enter the tunnel 140, and provide the service to the vehicle 130 according to the vehicle data 436.

In some implementations, the queue manager 210 receives a wireless signal from the operator device 150 (e.g., a smartphone executing an application 152 with a GUI 252). The signal can be a signal generated in response to an interaction of an operator with an active element (e.g., a menu selection or a button) of the GUI 250. The signal can be configured (e.g., via computer code or commands) to cause or issue an instruction, such as an instruction to control (e.g., operate) a gate 160, an instruction to update a tunnel queue 434, or an instruction to send an alert to other operator devices 150 that the operator of the transmitting operator device 150 has selected to service a vehicle 130 at a particular lane. The queue manager 210 can be communicatively coupled to the operator device 150. Responsive to receiving the wireless signal, the queue manager 210 can transmit the instruction (e.g., second instruction) instructing the car wash controller 104 to add the vehicle data 412 regarding the next vehicle 130 in the system queue 410. The wireless signal can be generated by the GUI manager 212 responsive to a user interaction with the GUI 250 (e.g., an operator selection of a portion 422 of a GUI 250). For example, the operator can determine a time at which to send the next vehicle 130 into the tunnel 140, and can delay the transmission of the vehicle data 412 to the car wash controller 104. The operator can dictate when to send the next vehicle 130 into the tunnel 140.

In some implementations, the car wash controller 104 does not allow vehicles 130 into the tunnel 140 unless the vehicle data 412 relating to the vehicle 130 is transmitted and input into the tunnel queue 434. Responsive to detecting the vehicle data 436 in the tunnel queue 434, the car wash controller 104 allows vehicles 130 into the tunnel 140. Thus, the queue manager 210 continually polls the car wash controller 104, and transmits instructions to add information (e.g., vehicle data 412) for a next vehicle in the system queue 410. The system queue 410 can store vehicle data 412 for multiple vehicles 130 while the tunnel queue 434 can only store vehicle data 436 for a singular vehicle 130.

After the second vehicle 130 enters the tunnel 140, the queue manager 210 can determine that the second vehicle 130 is not in the tunnel queue 434 by polling the car wash controller 104. The queue manager 210 can determine that the second vehicle 130 is not in the tunnel queue 434 based on the change in the status 438. The queue manager 210 can determine that the second vehicle 130 is not in the tunnel queue 434 by determining that the tunnel queue 434 is empty (e.g., does not include the vehicle data 436). Responsive to determining that the second vehicle 130 is not in the tunnel queue 434, the queue manager 210 can transmit an instruction to the car wash service manager 208 to validate that the car wash service provided to the second vehicle 130 was the car wash service identified in the vehicle data 412 (e.g., information) of the second vehicle 130 provided to the car wash controller 104. For example, the queue manager 210 can retain the vehicle data 412 of the second vehicle 130, and can receive information from the car wash service manager 208 to validate the car wash service provided to the second vehicle 130. The information received from the car wash service manager 208 can include the service, such as the car wash type and service settings, provided to the vehicle 130. The queue manager 210 can compare the information with the vehicle data 412. After determining that the car wash service information and the vehicle data 412 related to the car wash service match, the queue manager 210 can remove the vehicle data 412 of the second vehicle 130 from the system queue 410 and transmit an instruction to the third party server 164. After determining that the car wash service information and the vehicle data 412 related to the car wash service do not match, the queue manager 210 can generate an alert to the operator device 150 indicating an error in the provision of the car wash service to the vehicle 130.

Responsive to determining that the second vehicle 130 is not in the second lane 134, the queue manager 210 can request information of a next vehicle 130 in the second lane 134. For example, the queue manager 210 can send a request to the camera manager 206 for the images 408 of the second lane 134. The queue manager 210 can continually receive the images 408 from the camera manager 206, and detect the next vehicle 130 from the images 408. The license plate processor 202 can receive the images 408 in parallel, and determine the license plate information 401, and the profile manager 204 can determine the vehicle profile 402 based on at least the license plate information 401. The queue manager 210 can place the next vehicle 130 in the system queue 410 responsive to receiving at least the license plate information 401.

The instruction to the third party server 164 can cause the third party server 164 to perform one or more operations (e.g., operation functions 260). The operation function 260 can use data of the entity profile 406 associated with the vehicle 130. The operation function 260 can include at least one of a point of sale transaction implemented used a third party system to an update to a log associated with at least one of the entity profile 406 or the vehicle profile 402 of the vehicle 130. For example, the third party server 164 can request payment from the driver of the vehicle 130 using the third party system based on the entity profile 406. In some implementations, the third party server 164 executes the payment based on payment information stored in the entity profile. As another example, the third party server 164 can update the log associated with at least one of the vehicle profile 402 or the entity profile 406 of the vehicle 130. The log can indicate the subscription of the vehicle 130, and the update can include recording the service provide to the vehicle 130, and, in some implementations, a number of services left in the subscription. In some implementations, the update indicates a time interval until the vehicle 130 can receive another service.

The GUI manager 212 can provide various information to the operator device 150 for display on the operator device 150. For example, the GUI manager 212 can provide data 418 to each operator device 150 of a plurality of operator devices 150. The data 418 (e.g., first data) can correspond to a first vehicle 130 in a first lane 134 of a plurality of lanes 134 of the facility 100. The GUI manager 212 can generate and provide the data 418 to the operator device 150 responsive to detecting the first vehicle 130 in the first lane 134. The first vehicle 130 may be detected by the camera manager 206 via the images 408. The data 418 can include vehicle data 430. The vehicle data 430 can include a status of the lane 134 (e.g., number of vehicles 130 in the lane 134), entity data associated with the entity profile 406 of the vehicle 130, and vehicle data associated with the vehicle profile 402 of the vehicle 130. The GUI manager 212 can generate the data 418 following extraction of the license plate information 401 from the images 408 by the license plate processor 202. The profile manager 204 can provide at least a portion of the data 418 to the GUI manager 212 based on determining a respective vehicle profile 402 and entity profile 406 based on the license plate information 401. For example, the profile manager 204 provides the entity data from the entity profile 406 and the vehicle data from the vehicle profile 402 of the vehicle 130 to the GUI manager 212. The camera manager 206 can determine the status of the lane 134 based on the images 408, and provide the status to the GUI manager 212. The GUI manager 212 can collate the information provided by at least the profile manager 204 and the camera manager 206 into the data 418 for transmission to the operator devices 150.

In some implementations, the data 418 includes an identifier for a portion 422 of the GUI 250. For example, the first data 418 includes an identifier for a first portion 422 of the GUI 250. The portions 422 of the GUI 250 can be split by pixels. For example, each of the portions 422 can be a group of pixels of the GUI 250. Each portion 422 can represent a status or a state of any portion of a facility 100, such as a status of a particular lane 134 (e.g., a first lane 134A, a second lane 134B or any other lane 134 being occupied by a vehicle or unoccupied), a gate 160 being open or closed, a state of a transaction being executed using a point of sale terminal with a third party server 164, or a status of a conveyor system 116 at the tunnel 140. Each group of the pixels can be identified by an identifier. The GUI manager 212 can generate the data 418 including the identifier to indicate to the application 152 which portion 422 of the GUI 250 to display the data object 426 on. In some implementations, the GUI manager 212 constructs (e.g., generates) the data 418 using the field value pairs 404. For example, the GUI manager 212 receives the field value pairs 404 from the profile manager 204 based on the license plate information 401 of the vehicle 130. The GUI manager 212 can include one or more of the field value pairs 404 in the data 418, such as the vehicle color information and the name of the color of the vehicle 130.

The transmission of the data 418 to the operator device 150 can cause the application 152 to present a data object 426 (e.g., first data object). The GUI manager 212 can transmit the data 418 to the data object generator 424. The data object generator 424 can generate the data object 426 using the data 418. The data object 426 can include one or more images 428 of the vehicle 130 and vehicle data 430. The vehicle data 430 can include at least the license plate information 401 of the vehicle 130. The data object 426 can be presented on the GUI 250 on a specified portion 422 of the GUI 250. For example, the data object generator 424 generates a first data object 426 for a first vehicle 130 on a first portion 422 of the GUI 250. The first portion 422 of the GUI 250 can be associated with the first lane 134, and can indicate that the first vehicle 130 is in the first lane 134. The application 152 can present the data objects 426 of each vehicle 130 in each lane 134, and the portion 422 of the GUI 250 that the vehicle 130 can be presented on depends on the lane 134 the vehicle 130 is in as well as a position of the vehicle 130 in the lane 134 (e.g., order). The first data object 426 can include a first image 408 of the first vehicle 130 as well as a first license plate information 401 of the first vehicle 130.

In some implementations, the data objects 426 generated by the data object generator 424 are color coded (e.g., marked by a color, such as red). The color coding can correspond to, or be indicative of, a status of a lane 134 or vehicle at a gate 160. The status can indicate whether a driver of the vehicle is seeking assistance or whether an operator should address the vehicle and offer assistance. The data object 426 indicative of a state of the vehicle or a lane can be updated to each of the operator devices 150. For instance, responsive to receiving an indication that an operator of a first operator device 150 of a plurality of operator devices 150 has selected a data object 426 indicative of the operator seeking to address a particular vehicle 130, the first operator device 150 can provide or trigger indications (e.g., data objects) to the remaining operator devices 150 of the plurality of operator devices 150. The indications can indicate to the remaining operator devices 150 that this lane is being addressed by the user or operator of the first operator device 150.

The data object generator 424 can color code the data objects 426 based on a status of an operation associated with the third party server 164. For example, the operation can be a point of sale transaction, and the status can include successful, in process, or failed. The data objects 426 can then be color coded based on the status, such as successful being green, in process being yellow, and failed being red. In some implementations, the status can be based on a number of car washes left in a subscription of the vehicle 130. For example, responsive to a number of car washes being above 0, the data object 426 can be color coded as green. Responsive to the number of car washes being equal to 0, the data object 426 can be color coded as red. Responsive to the number of car washes being at or below a threshold value greater than 0, the data object 426 can be color coded as yellow.

In some implementations, the GUI manager 212 includes a data structure. The camera manager 206 and the license plate processor 202 can extract information from the images 408 of the first vehicle 130 in the first lane 134, and can provide the information to the GUI manager 212. The information can include, for example, features of the vehicle 130 and the license plate information 401. Using the data structure, the GUI manager 212 can identify information associated with the entity profile 406 of the first vehicle 130. The data structure can associate the information in the entity profile 406 and the data 418 for each vehicle 130 stored in the vehicle profiles 402. For example, the data structure includes entity data from the entity profile 406 and vehicle data from the vehicle profile 402, and associates the information based on the license plate information 401. The GUI manager 212 can select the data 418 (e.g., first data 418) from the data structure based on the information associated with the entity profile 406. The GUI manager 212 can select the data 418 based on the license plate information 401.

Following selection of the data 418, the GUI manager 212 can generate a data package. The data package can include the data 418 for transmission to each operator device 150 of the one or more operator devices 150. The data package can include one or more instructions 420 to cause each of the operator devices 150 to generate the data object 426 based on the data 418. The instructions 420 can include to generate the data object 426 by placing the information associated with the entity profile 406 into one or more sub-portions of the portion 422. For example, the GUI manager 212 can include instructions 420 instructing the data object generator 424 to include entity data in the data object 426. The information associated with the entity profile 406 to be included in the data object 426 can include, for example, the subscription or name of the driver.

The GUI manager 212 can provide additional data 418 (e.g., second data 418) to each operator device 150. For example, the GUI manager 212 can generate the second data 418 based on a second vehicle 130 in a second lane 134 of the facility 100. The second data 418 can correspond to the second vehicle 130. The GUI manager 212 can generate the second data 418 responsive to the camera manager 206 detecting the vehicle 130 in the second lane 134. The second data 418 can include an indication of a second portion 422 of the GUI 250. The data object generator 424 can receive the second data 418, and generate a second data object 426 based on the second data 418. The second data object 426 can include the images 428 (e.g., second image 428) and the vehicle data 430 (e.g., second license plate information 401) of the second vehicle 130. The data object generator 424 can provide the second data object 426 to the application 152 for display on a second portion 422 of the GUI 250. The second portion 422 can be associated with the second lane 134, and can indicate that the second vehicle 130 is in the second lane 134. The second data object 426 can be presented concurrently with the first data object 426. For example, the second data object 426 is adjacent to the first data object 426 on the GUI 250, and are presented simultaneously.

The GUI manager 212 can extract data about the driver from the entity profile 406 associated with the driver of the vehicle 130. The data about the driver can be the entity data of the entity profile 406. Based on the data about the driver, the instructions 420 transmitted to the application 152 by the GUI manager 212 can include a note. The note can include the data about the driver, and the instructions 420 can indicate to the application 152 to display the note in the second portion 422 of the GUI 250. The note can include a name, subscription, and other information included in the entity profile 406. The note can be included in the data 418, and can be transmitted to each of the operator devices 150 in the data package alongside the instructions 420.

Data processing system 118 can include the functionality for utilizing QR codes 166 to allow for vehicle identification, verification, and user selection and customization of vehicle services. For example, upon driving up to a lane 134 or a gate 160 of a facility 100, a user (e.g., a driver) can scan the QR code 166 using their smartphone. The QR code 166 can be positioned at any location at the facility 100, including on, adjacent to, or along a lane 134, a gate 160, entrance to a tunnel 140 or car wash tunnel system 105. Upon scanning, the QR code 166 can direct the smartphone of the user to a webpage where the user can select from a variety of car wash services of the facility 100, including a basic wash, a premium wash, or a special polishing service. The user can also choose to upgrade their service type from a one-time wash to a monthly or annual subscription. The webpage or the application provided via the QR code 166 can allow the user to configure specific preferences associated with the vehicle profile 402 or vehicle data 412, such as opting for a tire shine or an underbody wash. Once the user has made their selections, the data processing system 118 can process the request and update the user's profile with the chosen services, ensuring that the car wash tunnel system 105 is prepared to provide the selected services when the vehicle enters the tunnel 140.

The QR code 166 can be used in conjunction with a license plate processor 202 to enhance security and personalization of services. For instance, when the user scans the QR code 166, the data processing system 118 can verify the user's identity by matching the data (e.g., identifier) of the smartphone that scanned the QR code with the license plate data captured by the license plate processor 202. The identifier can include, for example, the phone's unique device ID, the user's account information, or a session token generated by the application. This verification process can validate the smartphone with the recognized license plate data to ensure that the services are provided to the correct vehicle and user. For instance, if the license plate processor 202 recognizes the license plate of the vehicle and matches it with the phone identifier, the data processing system 118 can grant access to the user's profile or account, allowing them to manage their services and preferences. This feature can provide an additional layer of security and personalization, ensuring that the services are tailored to the specific needs and preferences of the user.

For example, the feature can be implemented by positioning a QR code 166 next to a gate 160, where a user can scan the QR code 166 with their smartphone. The data processing system 118 can then verify the user's identity by matching the phone identifier on the QR code 166 with the license plate data captured by the license plate processor 202. Upon successful verification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

Data processing system 118 can be configured to utilize Bluetooth beacons, other wireless beacons, or transponder devices to identify users and vehicles within the facility 100. Car beacons can be installed in vehicles and can transmit a unique identifier (e.g., unique vehicle identifier) that can be detected by the facility's beacon receivers or reader devices. When a vehicle equipped with a car beacon or transponder device enters the facility 100 (e.g., premises or a car wash building), the beacon receiver or reader device can capture the unique identifier and transmit it to the data processing system 118. The data processing system 118 can then match the unique identifier with the vehicle profile 402 or vehicle data 412 stored in the system, allowing for seamless identification and verification of the vehicle. In response to the identification and verification, the system can allow the user to access vehicle data or client account and make changes, such as service configures or service selections for the vehicle. This can allow the system to provide personalized services and streamline the user experience by automatically recognizing the vehicle and its associated preferences.

The transponder devices can include at least one radio-frequency identification (RFID) tag which includes the unique identifier. The reader device can emit radio signals, and the RFID tag can receive the radio signals and return the unique identifier. The reader device can capture the unique identifier and transmit the unique identifier to the data processing system to identify and verify the vehicle. As with other transponder device examples, the RFID tags can be utilized to uniquely identify a user or the vehicle and can be used in combination with other techniques (e.g., license plate recognition or QR code scanning) to validate identification of the user and provide access to user data and service control functionalities.

For instance, phone beacons, transponders or RFID tags can be used to identify users based on the unique identifier or signal transmitted by their smartphones. For instance, a phone beacon can be any wireless device that transmits a unique identifier from a smartphone, allowing the data processing system 118 to detect and identify the user based on the transmitted identifier. When a user with a phone beacon-enabled smartphone, or an RFID tag, enters the facility, the beacon receiver or reader device can detect the unique identifier and send it to the data processing system 118. The data processing system 118 can match the unique identifier with the user's profile or account information, allowing for personalized service customization and verification. For example, the system can grant access to the user's profile, enabling them to select and configure car wash services, change their service type, and update their preferences. This integration of phone beacons can improve security and personalization, providing for services that the users can tailor to their specific needs and preferences.

For example, the feature can be implemented by installing car beacons or transponder devices in vehicles and configuring the data processing system 118 to detect the unique identifier transmitted by the car beacon or transponder device (e.g., RFID tag) when the vehicle enters the facility. The beacon receiver or reader device can capture the unique identifier and transmit it to the data processing system 118, which can then match the identifier with the vehicle profile 402 or vehicle data 412. Upon successful identification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

The car beacon or transponder devices (e.g., RFID tags) can be used in conjunction with a license plate processor 202 or QR codes 166 to enhance security and personalization of services. For instance, when a radio signal (e.g., beacon signal) from a car beacon or transponder device indicates or identifies a particular vehicle or a user associated with a vehicle, the data processing system 118 can verify or validate the user's identity by matching the data of the radio signal with a license plate data determined by a license plate processor 202 or a scanned the QR code. The data of the radio or beacon signal can include signal information or code uniquely identifying a vehicle or user of the vehicle, which can be matched with QR code data or license plate data to validate or verify the identification. This verification process can improve the security of the system and ensure that the services are provided to the correct vehicle and user. For instance, if the license plate processor 202 recognizes the license plate of the vehicle and matches it with the beacon signal, the data processing system 118 can grant access to the user's profile or account, allowing them to manage their services and preferences.

At least one of the third party server 164 or the car wash service manager 208 can identify an issue associated with the vehicle 130, such as the second vehicle 130. The issue can be related to (e.g., correspond to) at least one of a point of sale operation (e.g., operation function 260) or a selection of service to provide at the facility 100. For example, the issue can be identified in response to the point of sale operation failing. The issue can be identified responsive to a service not being available at the facility 100 or the car wash service provided to the vehicle 130 not being validated, among others. Responsive to identifying the issue, the GUI manager 212 can transmit data 418 (e.g., fourth data 418) corresponding to the vehicle 130 to cause the application 152 to present another data object 426. The data object generator 424 can receive the data 418, and generate the data object 426 including a request to assist with the issue associated with the vehicle 130. The request can be viewed by at least one operator who can provide assistance to the vehicle 130. The data object 426 can be displayed on the second portion 422 of the GUI 250. For example, the request to assist with the issue can be located on top of or overlaid the data object 426 of the vehicle 130 on the GUI 250.

In some implementations, the GUI manager 212 receives a response to the request to assist displayed on the GUI 250. The response can be received from at least one operator device 150 (e.g., first operator device) of the one or more operator devices 150. The response can indicate that the request has been received, that the issue is resolved, or that the issue is being resolved, among others. Responsive to receiving the response, the GUI manager 212 can generate data 418 (e.g., fifth data 418) for the second portion 422 of the GUI 250 on at least a subset of the operator devices 150. The subset of the operator devices 150 can exclude the first operator device 150. The GUI manager 212 can include the ML model 222 to generate data 418 based on the response. For example, the ML model 222 can be a natural language processor (NLP), and the ML model 222 can generate the data 418 based on the response. The data object generator 424 can generate a data object 426 (e.g., fifth data object 426) using the data 418. The fifth data object 426 can include an indication 432 (e.g., notification, alert) that the issue associated with the vehicle 130 is being addressed. The indication 432 can be a text string on the GUI 250 of the subset of the operator devices 150, and can indicate the first operator device 150 addressing the issue.

Responsive to receiving the response to the request, the GUI manager 212 can transmit the data 418 to the first operator device 150. The data object generator 424 of the first operator device 150 can generate a data object 426 (e.g., sixth data object 426). The data object 426 can include one or more windows to address the issue associated with the vehicle 130. The one or more windows can be presented on at least one portion 422 of the GUI 250 of the first operator device 150. The windows can include options for addressing the issue, such as retrying payment or refunding the driver, among others. The ML model 222 can generate the windows and provide data relevant to the issue. The operator of the first operator device 150 can select at least one window to address the issue. In some implementations, the GUI manager 212 receives an updated response to the request to assist from the first operator device 150. The updated response can be generated based on at least one of the selected window or an input by the operator. The input can include a method of how the operator addressed the issue. Responsive to receiving the updated response, the GUI manager 212 can transmit data 418 (e.g., sixth data 418) to the subset of operator devices 150. The data object generator 424 can generate a data object 426 (e.g., sixth data object) using the data 418 including an indication 432 that the associated with the vehicle 130 is addressed. The data object 426 can be displayed at the portion 422 of the GUI 250 associated with the vehicle 130 having the issue to be addressed.

Responsive to the GUI manager 212 receiving an indication that the issue associated with the vehicle 130 is addressed, the GUI manager 212 can transmit instructions (e.g., instruction 420) to the car wash controller 104. The indication can include the updated response. In some implementations, the ML model 222 receives the indication as an input, and outputs the instructions. In some implementations, the indication is transmitted by at least one of the operator devices 150 indicating that the issue is addressed. The instructions 420 can include an instruction to actuate the gate 160. The car wash controller 104 can receive the instructions 420, and actuate the gate 160 to, for example, allow the vehicle 130 into the tunnel 140. The instructions 420 can include an instruction to control a car wash controller 104, operate service equipment 110, activate or control a conveyor system 116, control a gate camera 120 or a tunnel camera 122, send a request for assistance to operators via operator devices 150, update a status of such the request for assistance (e.g., that an operator has indicated that she will address the issue), or any other instruction relating any other facility system component, operation or action.

The camera manager 206 can determine that the first vehicle 130 is not in the first lane 134. Responsive to determining that the first vehicle 130 is not in the first lane 134, the camera manager 206 can transmit an indication to the GUI manager 212. Upon receipt of the indication, the GUI manager 212 can transmit the instruction 420 to the operator device 150 to cause the application 152 to cease presentation of the data object 426 (e.g., first data object 426) associated with the first vehicle 130 on the first portion 422 of the GUI 250. Following ceasing of the presentation, the first portion 422 can be empty. Responsive to ceasing presentation of the data object 426, the GUI manager 212 can transmit data 418 including placeholder data to each operator device 150. The application 152 can display the placeholder data on the first portion 422, and any portion 422 of the GUI 250 not including a data object 426. The placeholder data can include, for example, space for images 428 of a vehicle 130 and space for vehicle data 430. The data object generator 424 can generate a placeholder data object 426 using the placeholder data. The placeholder data object 426 can include an indication (e.g., indication 432) that the first lane 134 is empty (e.g., does not include any vehicles 130). The placeholder data object 426 can be generated and displayed for any lane 134 that is empty. Each lane 134 can correspond to a portion 422 of the GUI 250.

Subsequent to the GUI manager 212 transmitting the instruction 420 to cease presentation of the first data object 426, the camera manager 206 can determine that another vehicle 130 (e.g., a third vehicle 130) of the one or more vehicles 130 is in the first lane 134. The camera manager 206 can provide the images 408 to the license plate processor 202 to determine the license plate information 401 of the vehicle 130. The profile manager 204 can then determine the associated vehicle profile 402 and entity profile 406 based on at least the license plate information 401.

Responsive to detecting the third vehicle 130 in the first lane 134, the GUI manager 212 can transmit to each operator device 150 data 418 (e.g., third data 418) corresponding to the third vehicle 130. The data object generator 424 can generate a data object 426 (e.g., third data object 426) using the data 418, and the application 152 can present the data object 426 in the first portion 422 of the GUI 250 associated with the first lane 134. The data object 426 can include at least the image 428 (e.g., third image 428) and license plate information 401 (e.g., third license plate information 401) of the vehicle 130. Each portion 422 of the GUI 250 can be continuously updated by the GUI manager 212 based on vehicles 130 entering and leaving the lanes 134.

Figure 5:
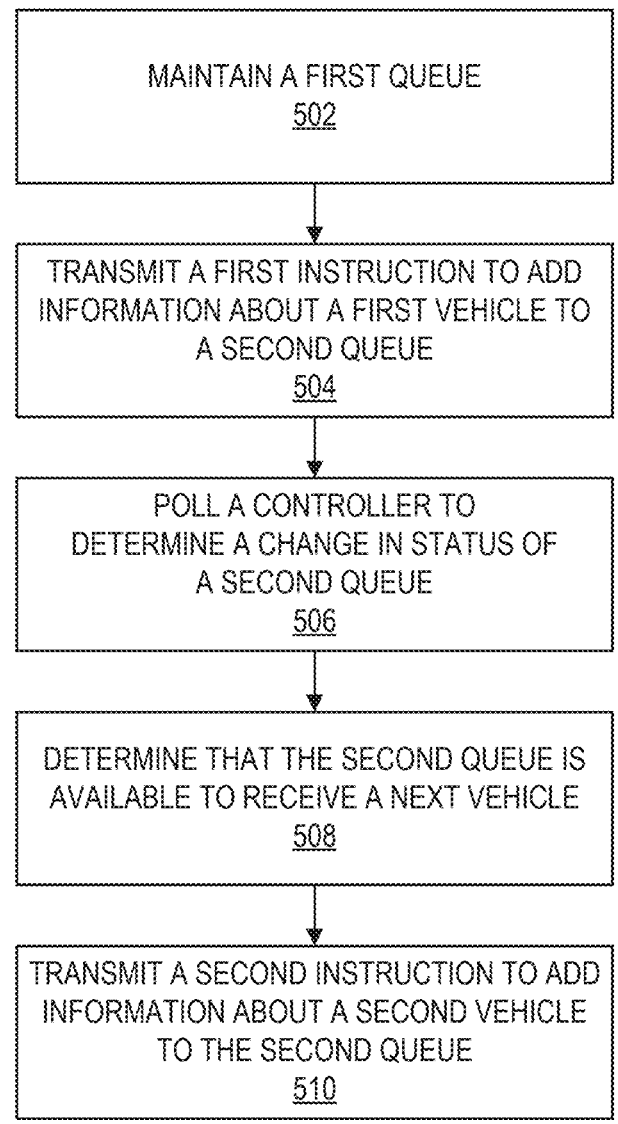
FIG. 5 is an example flow diagram of a method for automated car wash facility throughput control.

FIG. 5 is an example method 500 for implementing at least one of the systems 200, 300, or 400 as described above. For instance, the example method 500 can be implemented using one or more processors (e.g., 310) executing instructions or data stored in one or more memories (e.g., 315, 320 or 325) of a computing device or an environment. The method 500 can include acts or operations indicated by blocks 502-510, which can be performed in any order or out of order illustrated in FIG. 5. For instance, depending on implementation, any of the acts corresponding to blocks 502-510 can be performed multiple times, omitted or performed in any order.

At block 502, the method 500 can include the data processing system maintaining a first queue of vehicles. The first queue can include a first vehicle and a second vehicle. The first queue can include any number of vehicles as reflected or present at the facility. The queue can include a line of vehicles formed in particular order and identified via the cameras of the system. The data processing system can utilize a queue manager to maintain the representation of the sequence or order of the vehicles in the first queue along with their respective data, services to be rendered or any other information for providing predetermined services to each of the vehicles in the queue.

The queue manager can generate the queue based on images from various cameras captured throughout the facility, such as facility lanes or tunnel entrance. For instance, one or more images of vehicles at an entrance of the car wash tunnel can be received and used to identify vehicles, retrieve their data and organize the queue of the system according to the order of vehicles reflected in the images. The one or more images can be captured by a tunnel camera. The one or more images can include images of the first vehicle and the second vehicle. An order of at least the first vehicle or the second vehicle in the first queue can be updated using the one or more images. The queue can include information (e.g., license plate data) identifying each of the vehicles and can identify the order or sequence of the vehicles based on their identifying information. The queue can identify the type of car wash to apply to each of the vehicles and any adjustments to car wash services.

At block 504, the method 500 can include the queue manager transmitting a first instruction to add information about a first vehicle to a second queue. The first instruction can be transmitted from the queue manager of the data processing system to a controller of a car wash tunnel system maintaining the second queue. The first instruction can include to add information about the first vehicle from the first queue to be provided to the second queue. The first vehicle can be the vehicle that is next in line to enter the tunnel of the car wash system to receive car wash services. The queue manager can update a status of the second queue subsequent to the car wash tunnel system permitting the first vehicle to enter a car wash tunnel. The information can identify a service to be provided to at least one of the first vehicle or the second vehicle by the car wash tunnel system. The information can include various vehicle information, such as the license plate information, make, model, and features of the vehicle, such as dimensions.

The controller can be configured to control one or more components of the car wash tunnel system, such as the resource dispensers, according to the service. The controller can provide the service according to the information in the second queue. Based on the service identified in the information, the controller can control at least a subset of the one or more components to provide the service according to the information. For example, the information can include a car wash type associated with a car wash type database stored by the controller. The controller can extract the car wash type from the car wash type database according to the information and provide the vehicle with the car wash type.

At block 506, the method 500 can include the queue manager of the data processing system polling the controller to determine a change in the status of the second queue. The queue manager can implement the polling over a serial connection. The second queue can be configured to hold data for only a single vehicle to be serviced by the car wash tunnel system. The polling can include a sequence of requests for the status of the second queue. The status can indicate whether the second queue is occupied or unoccupied. The sequence of requests can be transmitted according to a predefined time period. The polling can be implemented every one or more milliseconds, such as up to every 10 milliseconds, 20 milliseconds, 50 milliseconds, 100 milliseconds, 300 milliseconds or every second. In response to each of the requests or polls, the controller can transmit a response indicating the most up to date status of the second queue.

The queue manager polling the controller can include emulating a keypad of the controller to transmit a command for polling using a plurality of requests to refresh the status of the second queue. For example, the sequence of requests can be sent mimicking pressing of button on a keypad to determine the status of the second queue. The queue manager can poll the controller responsive to a signal generated in response a selection on a graphical user interface of an operator device. For example, the operator can poll the controller based on interactions with the GUI of the operator device to determine the status of the second queue.

At block 508, the method 500 can include the data processing system determining that the second queue is available to receive a next vehicle. The second queue can be a queue of a car wash system. The second queue can be a single-vehicle queue of the car wash system for loading vehicle data about the vehicle, including data on service to provide to the vehicle, into the car wash system. The second queue can be determined to be available based on the change in the status (e.g., status that the car wash system is now available or capable to receive and service a next vehicle in the queue). For example, the status can indicate a presence or an absence of a vehicle in the second queue, such as that the second queue is empty and available to receive or service a next vehicle from the first queue. The change in the status can be a difference between the status at a first polling of the controller vs a second polling of the controller (e.g., first sequence of requests and second sequence of requests). The difference can indicate that the status has changed to being available compared to a first polling indicating the second queue was unavailable.

The queue manager can determine that the second queue is available in response to determining that the second queue is unoccupied. The queue manager can determine that the second queue is available to receive a next vehicle after the vehicle in the second queue has been sent into the car wash tunnel system. The sequence of requests can be continually sent to determine the status, and the change in status can be determined after the vehicle in the second queue has been sent into the car wash tunnel system.

At block 510, the method 500 can include the data processing system transmitting a second instruction to add information about a second vehicle to the second queue. The second instruction can be transmitted by the queue manager to the controller of the car wash system, responsive to the determination that the second queue is available or unoccupied (e.g., and ready to receive the next vehicle from the first queue). The second instruction can cause the car wash tunnel system to permit the second vehicle into the car wash tunnel. The information can identify a service to be provided to at least one of the first vehicle or the second vehicle by the car wash tunnel system. The controller can be configured to control one or more components of the car wash tunnel system according to the service. The second instruction can be transmitted responsive to receiving a wireless signal from an operator device. Following the second vehicle entering the car wash tunnel, the second vehicle can be determined to not be in the second queue.

The car wash service identified by the information provided to the second vehicle can be validated in response to the second vehicle determined to not be in the second queue. A third party service can perform operations using data of an entity profile associated with the second vehicle in response to the validation. The one or more operations can include at least one of a point of sale transaction implemented using the third party system or an update to a log associated with at least one of the entity profile or a vehicle profile of the second vehicle. A camera manger can identify a feature of the second vehicle based on one or more images captured by one or more cameras of a facility including the car wash tunnel system. A subset of the components of the car wash system for providing a service to the second vehicle can be activated based on the vehicle feature. At least one of the first instruction or the second instruction can include an enter queue command provided over a serial connection.

Figure 6:
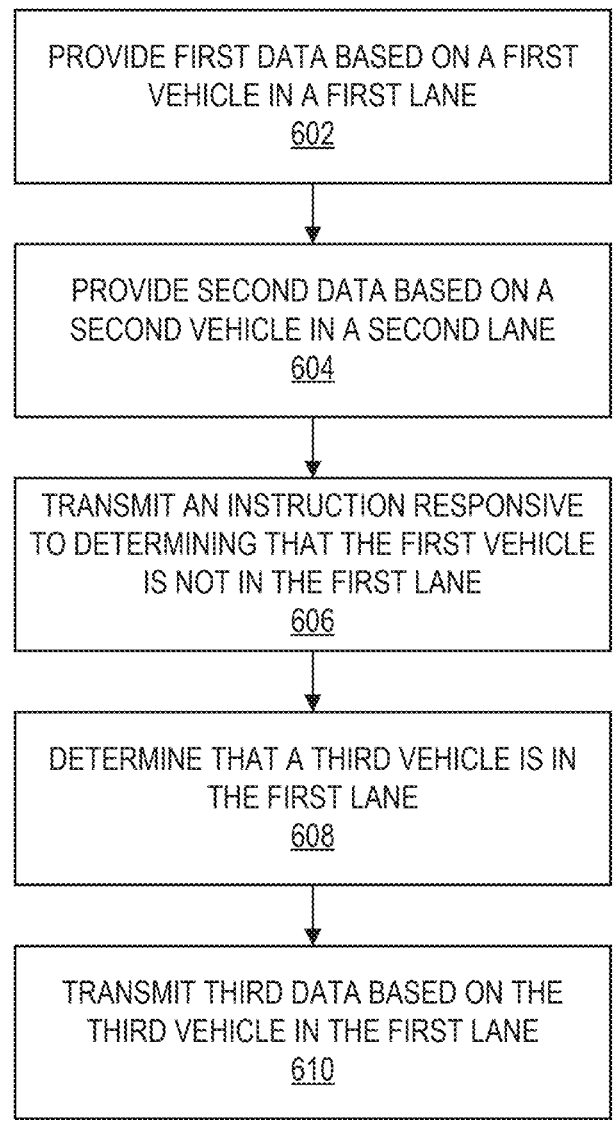
FIG. 6 is an example flow diagram of another method for automated car wash facility throughput control.

FIG. 6 is an example method 600 for implementing at least one of the systems 200, 300, or 400 as described above. For instance, the example method 600 can be implemented using one or more processors (e.g., 310) executing instructions or data stored in one or more memories (e.g., 315, 320 or 325) of a computing device or an environment. The method 600 can include acts or operations indicated by blocks 602-610, which can be performed in any order or out of order illustrated in FIG. 6. For instance, depending on implementation, any of the acts corresponding to blocks 602-610 can be performed multiple times, omitted or performed in any order.

At block 602, the method 600 can include a data processing system providing first data corresponding to a first vehicle to cause a mobile application to present a first data object. The first data can be provided based on a first vehicle in a first lane of a plurality of lanes of a facility. A GUI manager of the data processing system can generate the first data object using the first data at a first portion of a GUI for displaying data of vehicles at the first lane. The first data object can include a first image of the first vehicle and a first license plate information of the first vehicle. Each operator device of a plurality of operator devices can execute the mobile application. The first data can include at least one of a status of a lane (e.g., first lane), entity data associated with an entity profile, or vehicle data associated with a vehicle profile linked to the entity profile. The first data object can be color coded based on a status of an operation associated with a third party server.

A camera manager of the data processing system can extract information from one or more images of the first vehicle in the first lane. Information associated with an entity profile associated with the first vehicle can be identified using a data structure. The data processing system can select the first data based on the information associated with the entity profile and a data package can be generated including the first data for transmission to each operator device of the plurality of operator devices. The data package can include one or more instructions to cause each of the plurality of operator devices to generate the first data object by placing the information associated with the entity profile into one or more sub-portions of the first portion.

In some implementations, the first data includes an identifier for the first portion of the GUI. One or more field value pairs can be extracted from a database. The one or more field value pairs can include at least one of a license plate and a series of characters of the license plate of the first vehicle, a vehicle type and a make and model information of the first vehicle, a vehicle color information and a name of a color of the first vehicle. The data processing system can construct he first data using the extracted one or more field value pairs. Responsive to provision of the first data, information associated with a car wash service can be identified to provide to the first vehicle in a tunnel of the facility.

At block 604, the method 600 can include the data processing system providing second data corresponding to a second vehicle to cause a mobile application to present a second data object. The second data can be provided based on a second vehicle in a second lane of a plurality of lanes of a facility. A GUI manager of the data processing system can generate the second data object using the second data at a second portion of a GUI for displaying data of vehicles at the second lane The second data object can be presented concurrently with the first data object. The second data object can include a second image of the second vehicle and a second license plate information of the second vehicle.

The second data can include at least one of a status of a lane, entity data associated with an entity profile, or vehicle data associated with a vehicle profile linked to the entity profile. The second data object can include the second data color coded based on a status of an operation associated with a third party server. For example, the data processing system can color code the second data object based on a number of car services remaining based on a subscription in at least one of the vehicle profile or the entity profile. The second data object can be color coded red responsive to no car services remaining and yellow responsive to the number of car services being at or below a threshold and above zero.

At block 606, the method 600 can include the data processing system transmitting an instruction to cause the mobile application to cease the presentation of the first data object at the first portion of the GUI responsive to determining that the first vehicle is not in the first lane to each operator device of the plurality of operator devices. Responsive to determining that the first vehicle is not in the first lane, the data processing system can transmit placeholder data to each operator device of the plurality of operator devices. The placeholder data can cause the mobile application to present at the first portion of the GUI a placeholder data object generated using the placeholder data.

The placeholder data object can include an indication that the first lane is empty. The data processing system can transmit the placeholder data to each operator device of the plurality of operator devices in response to ceasing the presentation of the first data object at the first portion of the GUI. Data about the driver can be extracted from an entity profile associated with a driver of the second vehicle. The data processing system can generate a note for display in the second portion of the GUI based on the data about the driver. The note can include, for example, a car wash service type, the number of car wash services remaining, etc.

In some implementations, the data processing system can identify an issue associated with the second vehicle. The issue can correspond to at least one of a point of sale operation or a selection of service to provide at the facility. Responsive to identifying the issue, a fourth data corresponding to the second vehicle can be transmitted to cause the mobile application to present a fourth data object at the second portion of the GUI. The fourth data object can be generated using the fourth data and can include a request to assist with the issue associated with the second vehicle. The data processing system can receive a response to the request to assist from a first operator device of the plurality of operator devices. Responsive to receiving the response, fifth data can be transmitted to cause the mobile application to present a fifth data object. The data processing system can generate the fifth data object using the fifth data and be presented at the second portion of the GUI of at least a subset of the plurality of operator devices that excludes the first operator device. The fifth data object can include an indication that the issue associated with the second vehicle is being addressed.

In some implementations, in response to receiving the response, sixth data can be transmitted to cause the mobile application of the first operator device to present a sixth data object generated using the sixth data. The sixth data object can include one or more windows to address the issue associated with the second vehicle. The data processing system can receive an updated response to the request to assist from the first operator device subsequent to receiving the response to the request. Responsive to receiving the updated response, sixth data can be transmitted to cause the mobile application to present, at the second portion of the GUI of at least the subset of the plurality of operator devices, a sixth data object. The sixth data object can be generated using the sixth data. The sixth data object can include an indication that the issue associated with the second vehicle is addressed. Responsive to receiving an indication that the issue associated with the second vehicle is addressed, an instruction to actuate the gate can be transmitted to a controller for the gate of the second lane.

In some implementations, a queue of one or more vehicles for entering a tunnel of the facility can be identified. Following the instructions to actuate the gate, an entry corresponding to the second vehicle can be included into the queue of vehicles.

At block 608, the method 600 can include the data processing system determining, subsequent to the transmission of the instruction, that a third vehicle of the plurality of vehicles is in the first lane. The camera manager can determine that the third vehicle is in the first lane using the one or more images. The third vehicle can be located in a spot previously occupied by the first vehicle. The camera manager can identify the license plate information and the vehicle profile of the third vehicle responsive to determining that the third vehicles is in the first lane.

The data processing system can identify an entity profile linked to the vehicle, and the car wash service type and various vehicle data can be extracted for the third vehicle. At least one of the vehicle profile or the entity profile can identify the make and model of the vehicle and the number of remaining car wash services for the vehicle. Images of the first lane can be continually received to determine an additional vehicle (e.g., the third vehicle) in the first lane of the service facility.

At block 610, the method 600 can include the data processing system transmitting third data corresponding to the third vehicle based on the third vehicle being in the first lane to each operator device of the plurality of operator devices. The third data can cause the mobile application to present a third data object at the first portion of the GUI. The data processing system can generate the third data object using the third data. The third data object can include a third image of the third vehicle and a third license plate information of the third vehicle. The third data can include at least one of a status of a lane, entity data associated with an entity profile, or vehicle data associated with a vehicle profile linked to the entity profile.

The third data object can be generated using the third data and can be color coded based on a status of an operation associated with a third party server. For example, the third data object can be color coded based on whether payment for the car wash service was successful or unsuccessful. Responsive to the data processing system determining that the second vehicle is not in the second lane, a request for information of a next vehicle in the second lane can be transmitted. For example, in response for information of the next vehicle, one or more images of the second lane can be received.

Referring to FIGS. 7A-7H, implementations of screenshots of one or more user interfaces of one or more applications for providing or implementing various features of the automated operation platform for a vehicle service facility are illustrated. The user interfaces can include one or more portions of the user interfaces for a dashboard of the data processing system to be utilized by a system administrator. The user interfaces can include one or more portions of the user interface for a mobile device of an operator. The user interfaces can identify various indications or alerts the viewers and allow the users to access, review and monitor various client data, attend to different issues (e.g., based on alerts or notifications) or monitor the overall operation.

Figure 7A:
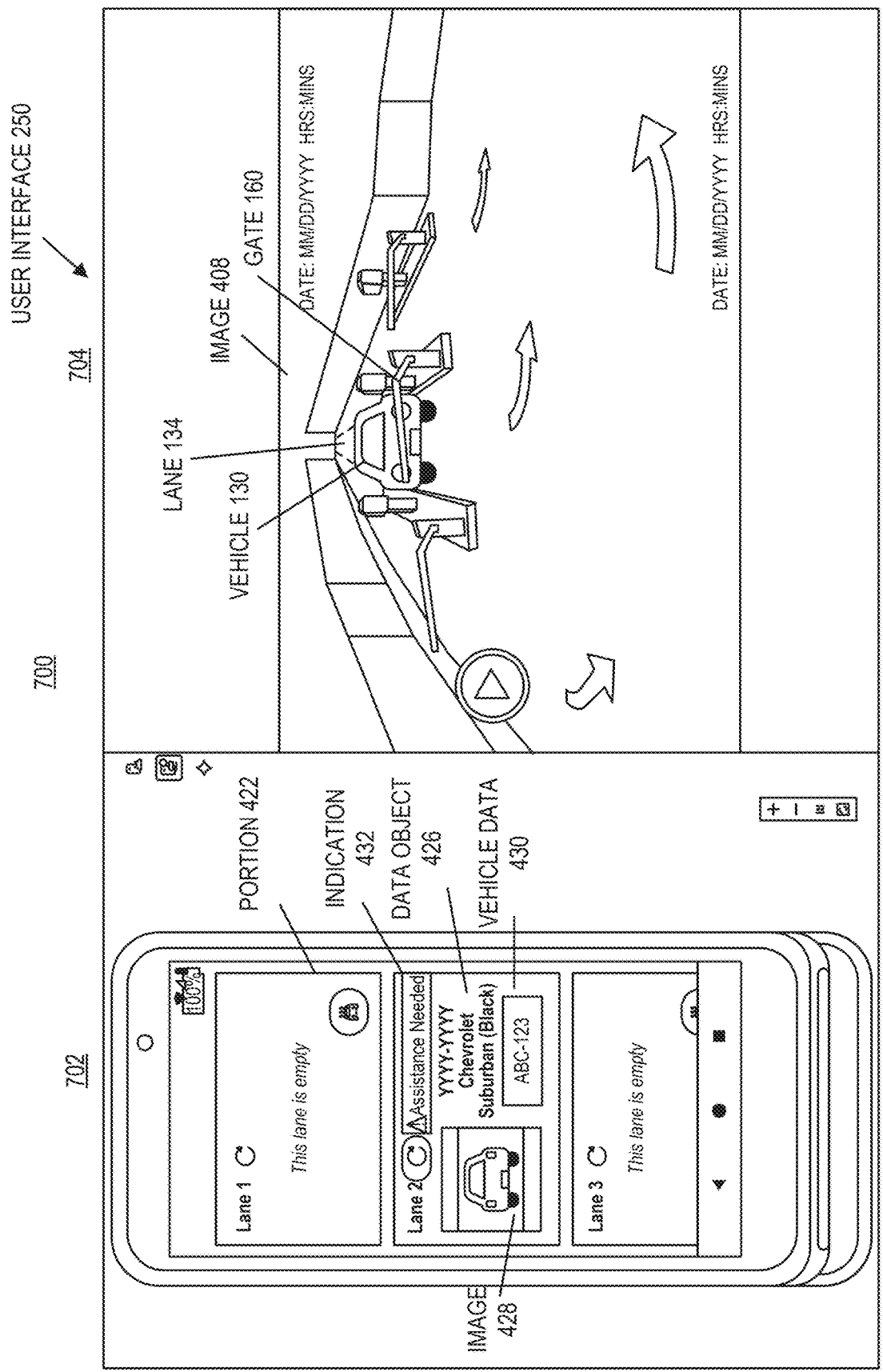
FIGS. 7A-7H are example screenshots of an application user interface for providing or implementing various features of the automated operation platform for a vehicle service facility.

At FIG. 7A, an example configuration 700 can include view 702 and view 704. At least one of the views (e.g., view 702, 704) and configurations (e.g., configuration 700) as described herein can be displayed on a GUI 250 of at least one of the operator device 150, the admin device 162, or the third party server 164. The view 704 can include an image 408 of a portion of a service facility (e.g., facility 100). In some implementations, the view 704 can be a video feed (e.g., live video from the gate camera 120). The image 408 can depict a first vehicle 130 in a second lane 134 of the lanes of the service facility. The first vehicle 130 can be positioned in the region of interest 135 behind the gate 160. The camera manager 206 can provide the image 408 to the GUI manager 212 to transmit the data 418 to each, for example, operator device 150 of the plurality of operator devices 150. The view 702 can include a GUI 250 showing a data object 426 in a second portion 422 of the GUI 250, indicating that the first vehicle 130 is in the second lane 134. The data object 426 can include an indication 432 alerting the operators that the first vehicle 130 needs assistance.

Figure 7B:
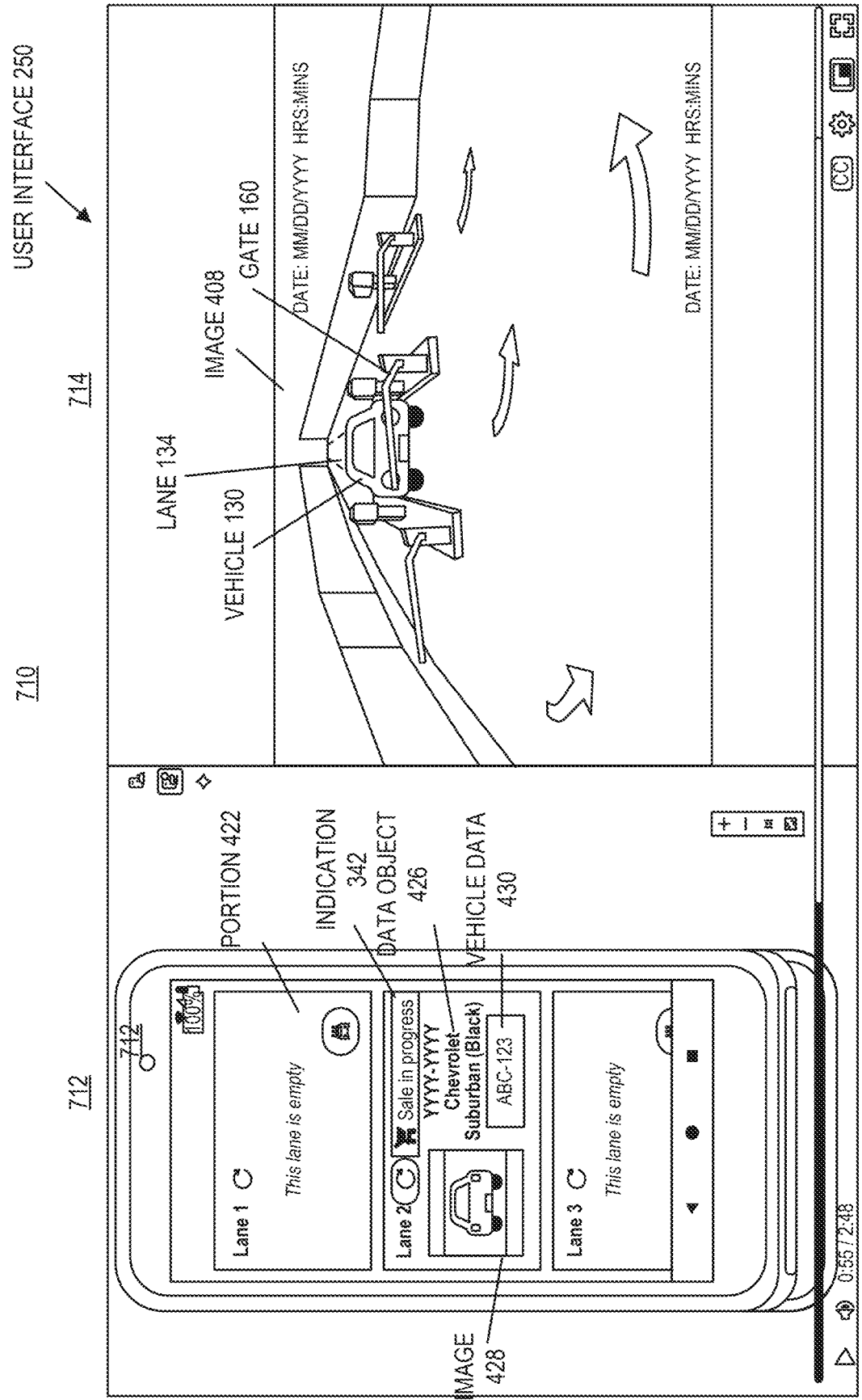

At FIG. 7B, a configuration 710 can include a view 712 including the data object 426 at the second portion 422 responsive to the first vehicle 130 still being at the second lane 134. The indication 432 on the data object 426 can be adjusted responsive to the first vehicle 130 receiving assistance. The assistance can be related to a point of sale transaction. The view 722 can include the image 408.

Figure 7C:
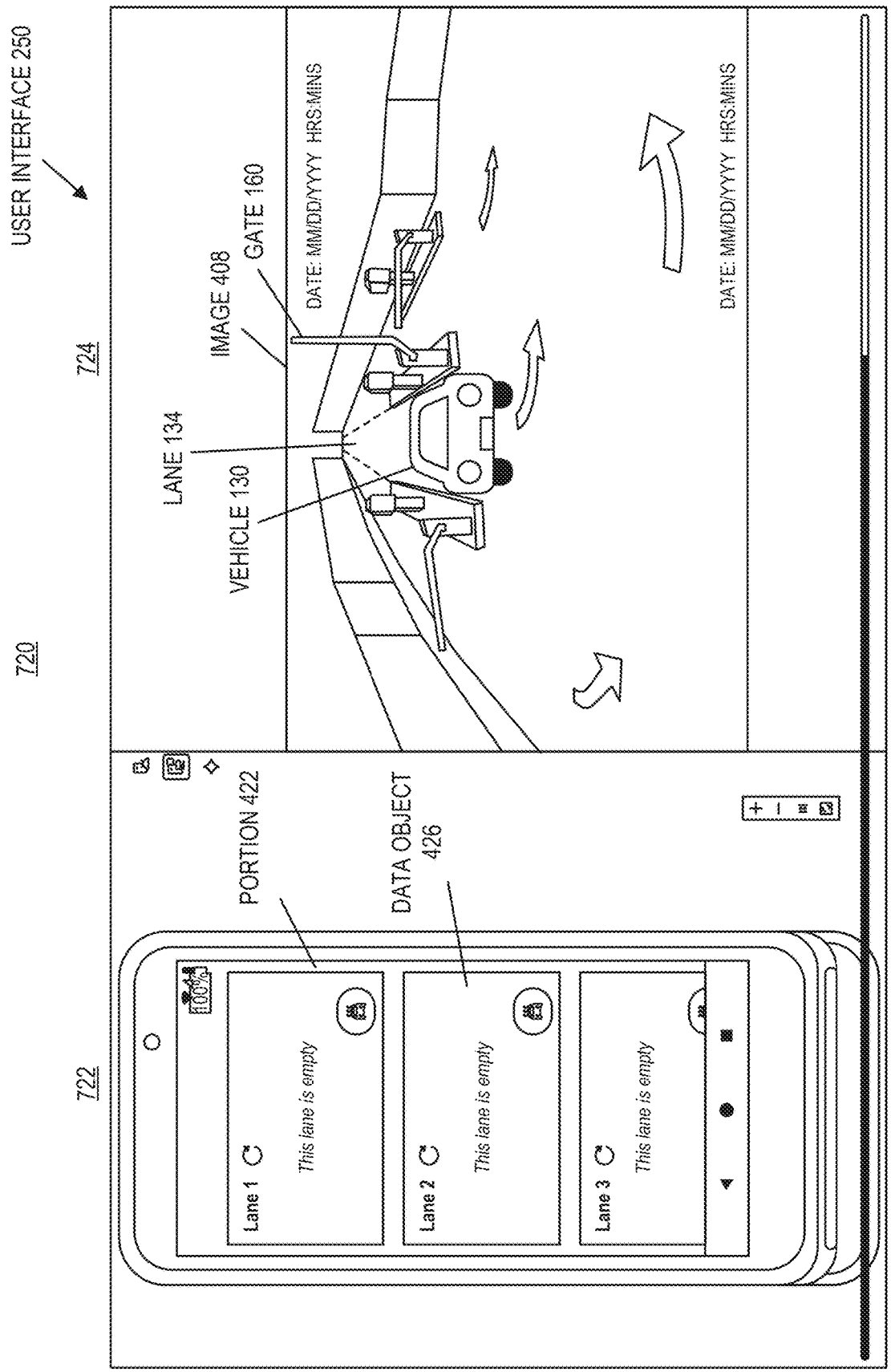

At FIG. 7C, a configuration 720 can include a view 722 including placeholder data as the placeholder data object 426 at the second portion 422 responsive to the gate 160 being actuated to allow the vehicle 130 into the tunnel 140. The GUI manager 212 can receive the image 408 from the camera manager 206, and transmit placeholder data to each, for example, operator device 150 for the data object generator 424 to generate the placeholder data object 426. The view 724 can include the image 408.

Figure 7D:
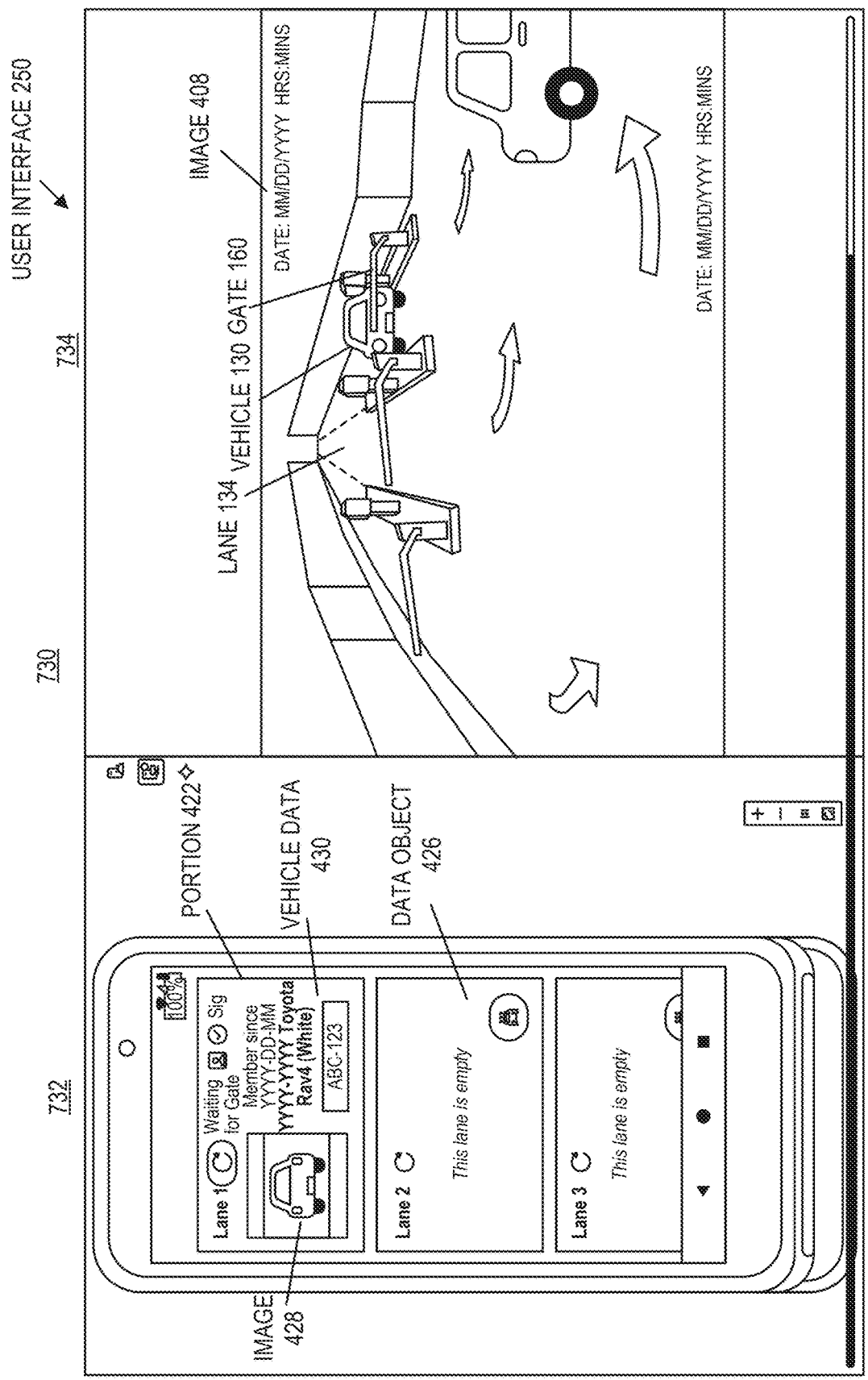

At FIG. 7D, a configuration 730 can include a view 732 including a data object 426 in the first portion 422 responsive to a second vehicle 130 being in the first lane 134. The GUI manager 212 can transmit the data 418 to generate the data object 426 responsive to the camera manager 206 receiving the image 408 identifying the second vehicle 130 in the first lane 134. The data object 426 can include the status of the first lane 134, such as "waiting for gate." The view 734 can include the image 408.

Figure 7E:
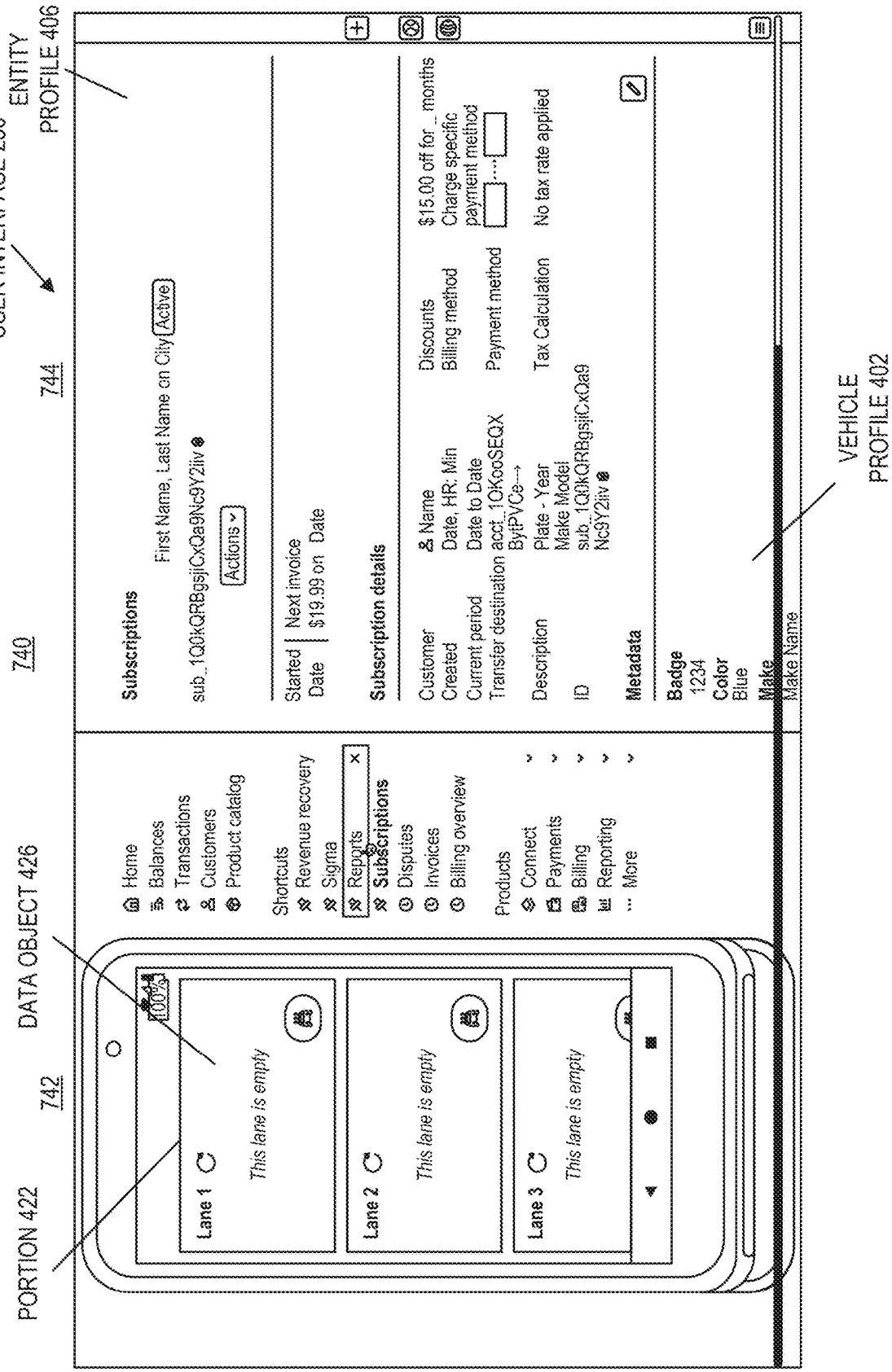

At FIG. 7E, a configuration 740 can include a view 744 including the entity profile 406 and the vehicle profile 402 of at least one vehicle 130. The view 744 can depict the entity profile 406 and the vehicle profile 402 of a most recent (e.g., latest) vehicle 130 allowed into the tunnel 140. The entity profile 406 can include subscription details while the vehicle profile 402 includes at least a color and make of the vehicle 130. The configuration 740 can include a view 742 including at least one placeholder data object 426 alongside the view 744.

Figure 7F:
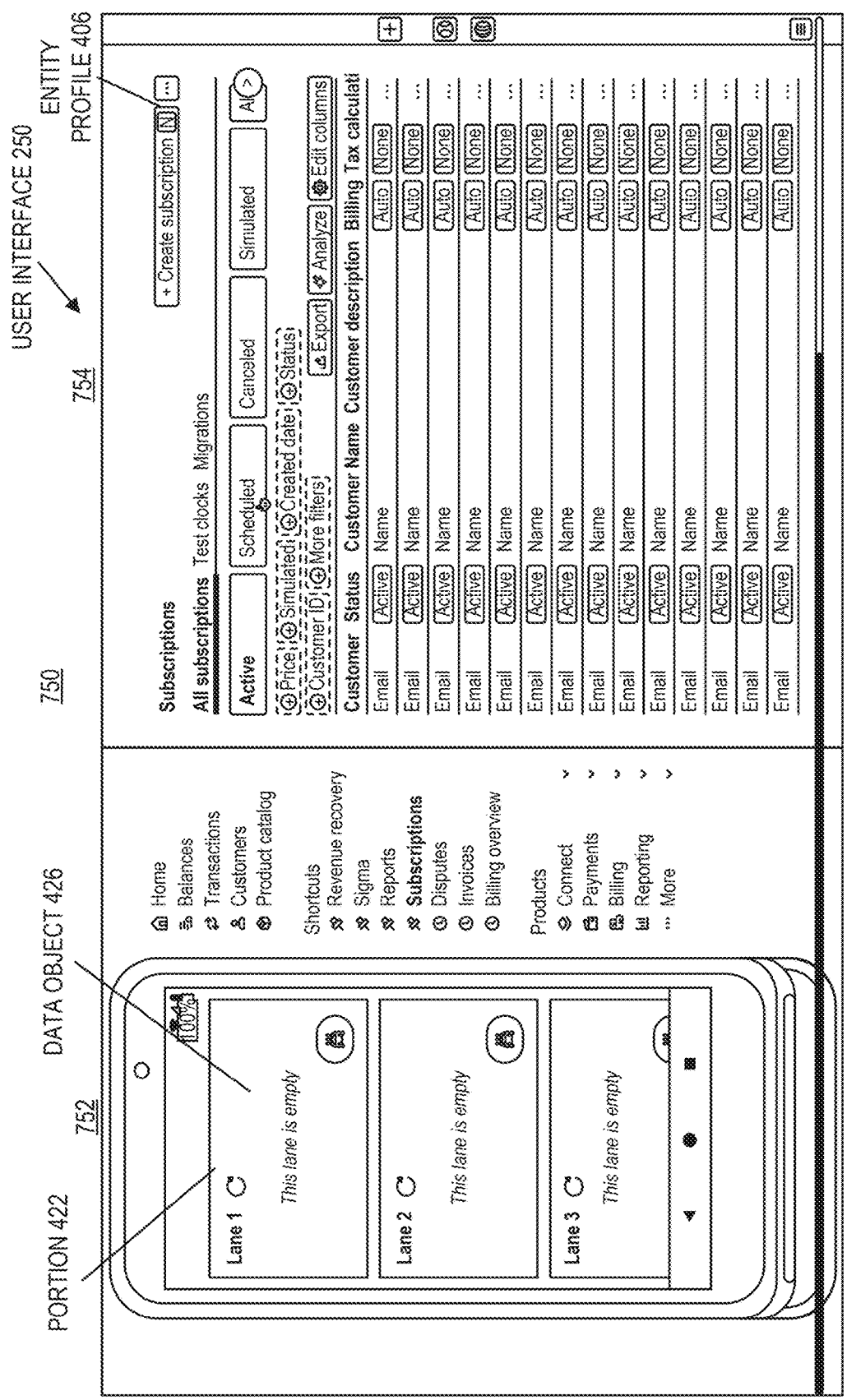

At FIG. 7F, a configuration 750 can include a view 754 including a plurality of entity profiles 406 of a plurality of vehicles 130 with subscriptions to the facility 100. The entity profile 406 can include at least an email, name, status, and billing (e.g., automatic or manual) of the driver of each of the vehicles 130. The configuration 750 can include a view 752 including the placeholder data object 426 alongside the view 754.

Figure 7G:
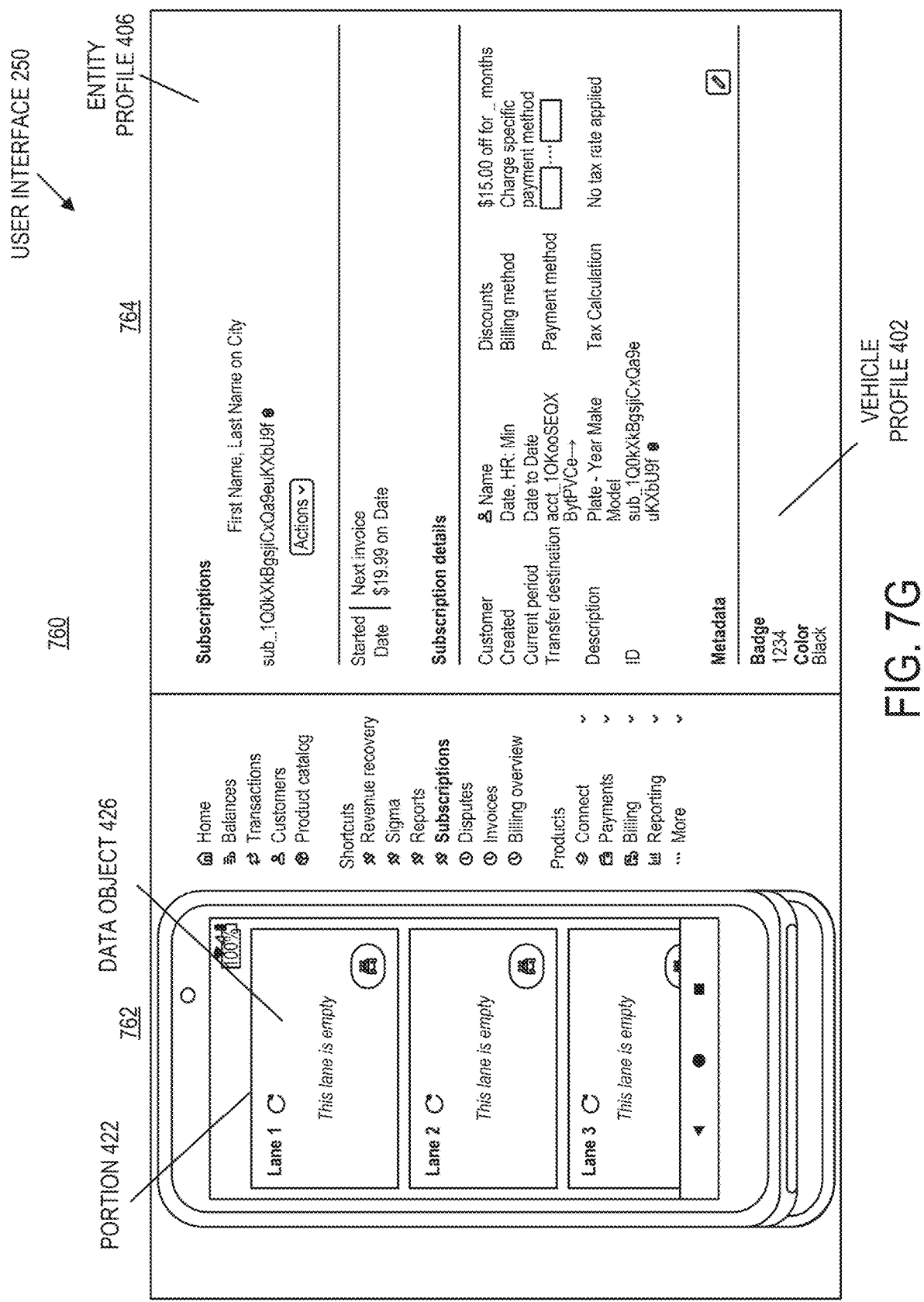

At FIG. 7G, a configuration 760 can include a view 764 including the entity profile 406 and the vehicle profile 402 of a single vehicle 130. The entity profile 406 can indicate a next payment date for the driver to continue receiving services per the subscription. The configuration 760 can include a view 762 including the placeholder data object 426 alongside the view 764.

Figure 7H:
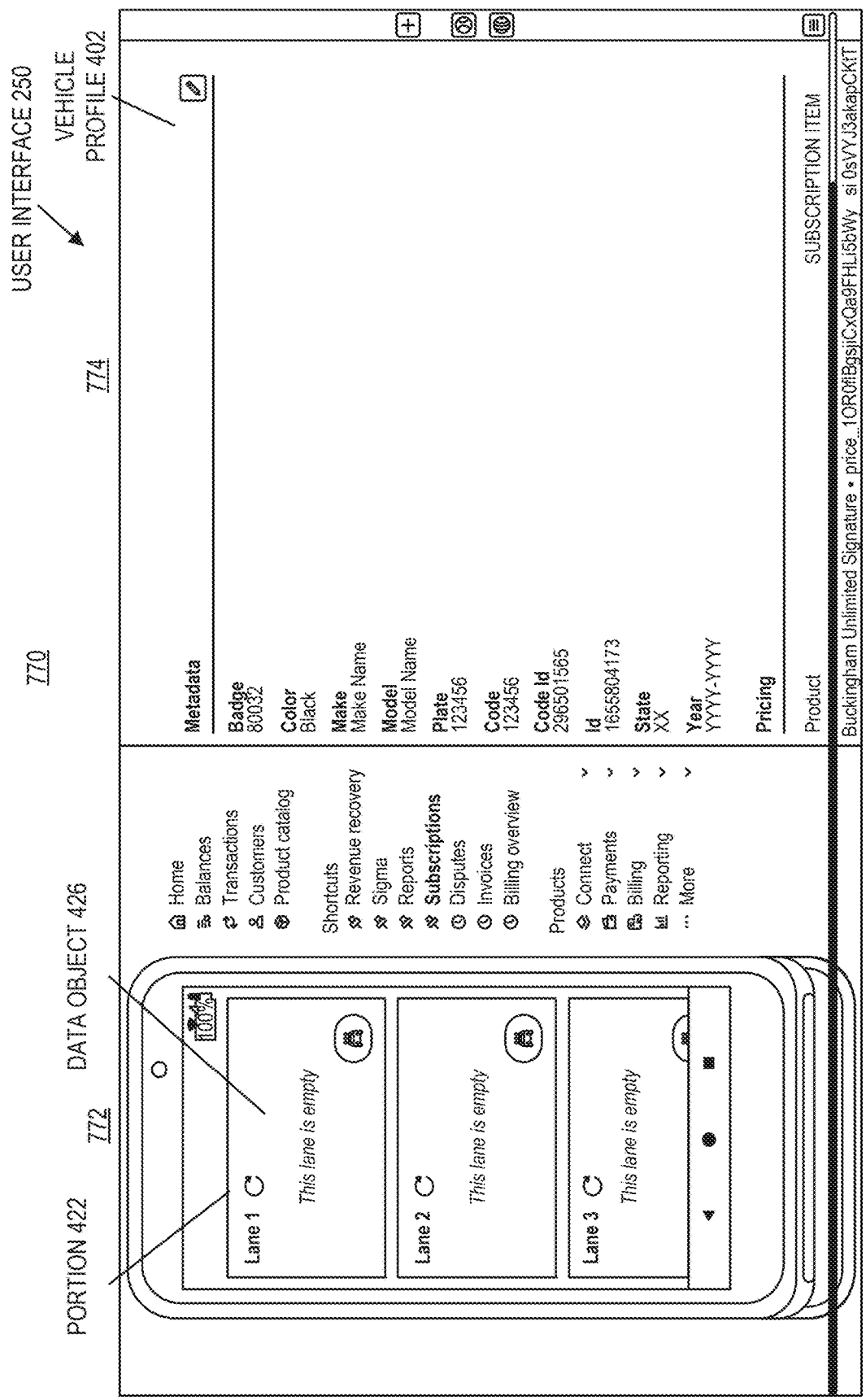

At FIG. 7H, a configuration 770 can include the vehicle profile 402 of a vehicle 130. The vehicle profile 402 can include at least a color, make, and model of the vehicle 130, and can be located on a same page as the entity profile 406. The configuration 770 can include a view 772 including the placeholder data object 426 alongside the view 774.

Figure 8A:
FIGS. 8A-8B are example flow diagrams of systems and methods for selectively actuating components of a vehicle service facility.
Figure 8B:
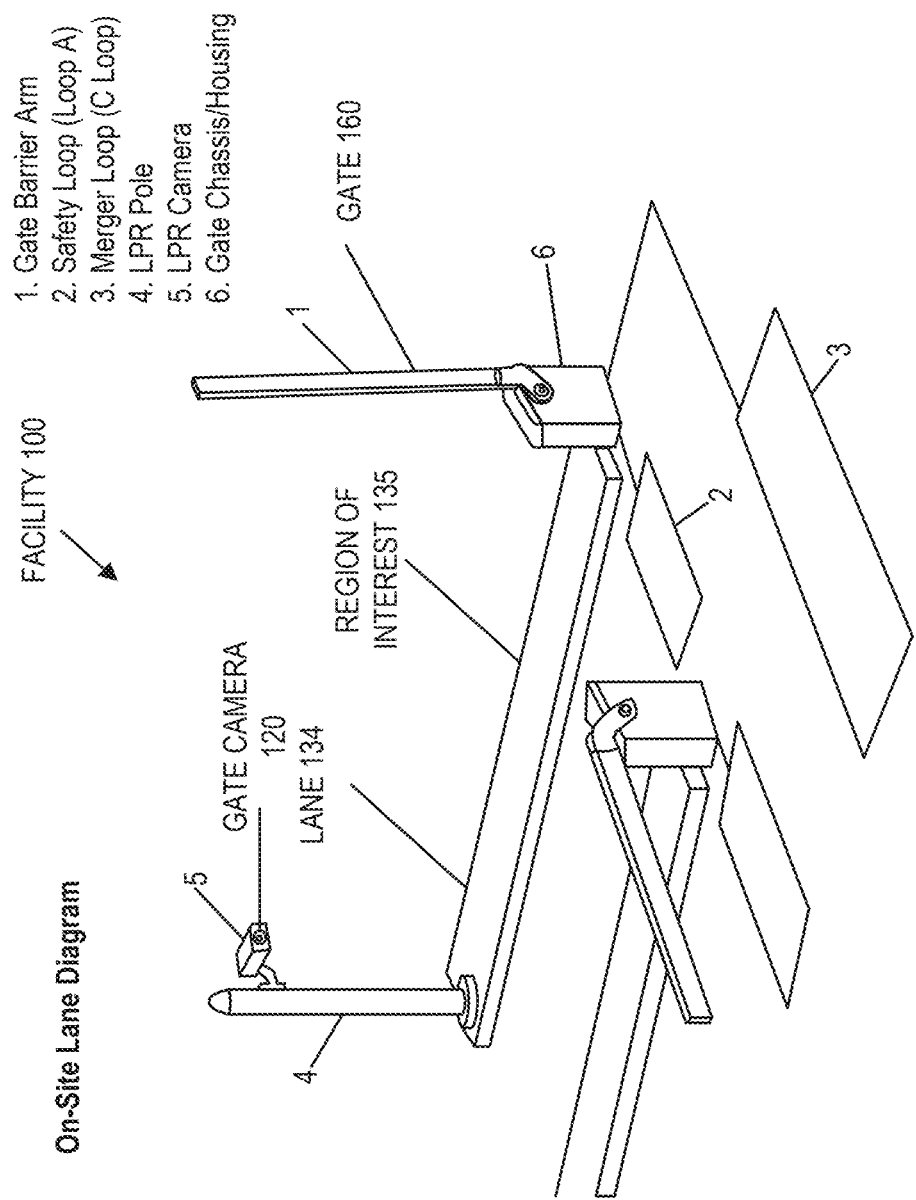

Referring now to FIGS. 8A-B, a process for updating the system queue 410 and positions of the vehicles 130 on the facility 100 can be depicted. FIG. 8A depicts a schematic 810 of updating the system queue 410. Following detection of the vehicle 130 by the gate camera 120, the data processing system 118 can determine the vehicle profile 402 to determine a car service to provide to the vehicle 130. After the determination, the data processing system 118 can input the vehicle 130 into the system queue 410 within the data processing system 118. A first position of the vehicle 130 can be a position closest to the tunnel 140. The schematic 810 can illustrate a process at which the system queue 410 is updated responsive to receiving, for example, images 408 indicating the order of vehicles 130 in at least one lane 134. The system queue 410 can be updated responsive to determining that the license plate information 401 of, for example, a first vehicle in the system queue 410 being different than a first vehicle in the first position.

FIG. 8B depicts an example portion 820 of the facility 100 which can include the gates 160, the region of interest 135, the lane 134, and the gate camera 120. The example portion 820 can include one or more loops which can detect a presence of the vehicle 130. The gates 160 can include a gate barrier arm and a housing. The gate camera 120 can be mounted onto a pole and face a direction of the gate 160. The portion 820 can include positions of the vehicle 130 behind the gate 160.

Figure 9A:
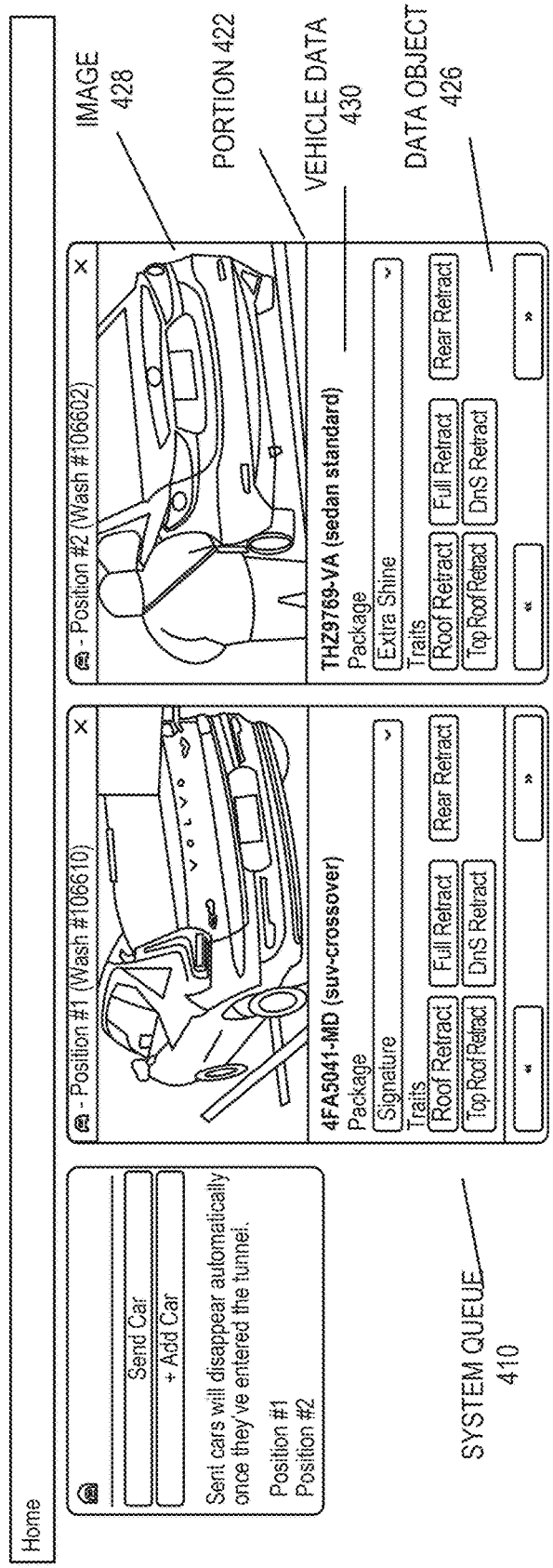
FIGS. 9A-9B are example screenshots of an application user interface for updating vehicle queue for a vehicle service facility.
Figure 9B:
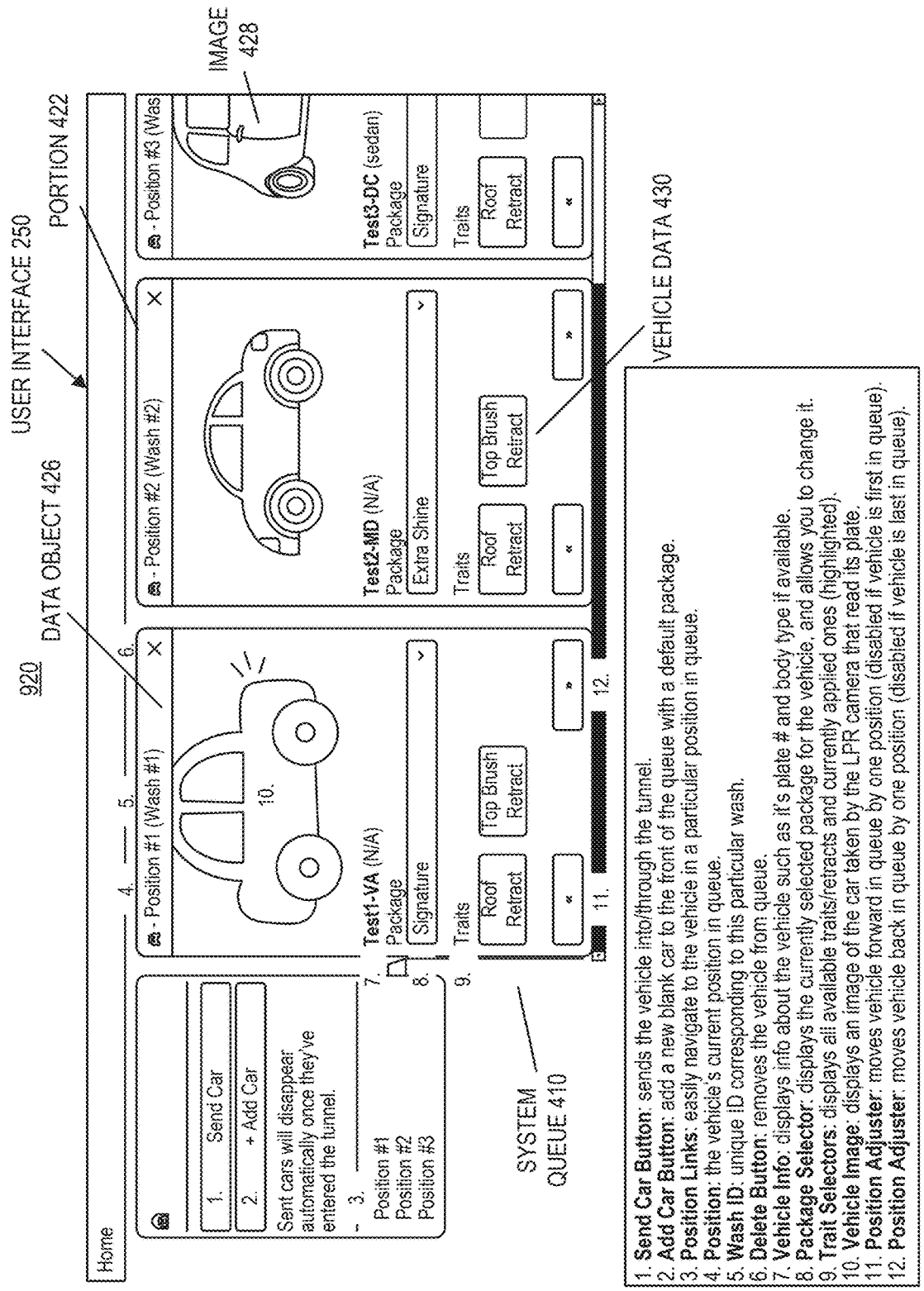

Referring to FIGS. 9A-9B, implementations of screenshots of one or more user interfaces of one or more applications for updating the vehicle queue are illustrated. The user interfaces can include one or more portions of the user interfaces for a dashboard of the data processing system to be utilized by a system administrator. The user interfaces can include one or more portions of the user interface for a mobile device of an operator. The user interfaces can identify various indications or alerts the viewers and allow the users to access, review and monitor various client data, attend to different issues (e.g., based on alerts or notifications) or monitor the overall operation.

A screenshot 910 depicts an example system queue 410 including a first data object 426 and a second data object 426. The data objects 426 can include at least the image 428 and the vehicle data 430 of a respective first vehicle 130 and second vehicle 130. The screenshot 910 can include a button to transmit, for example, a wireless signal to the car wash controller 104 to allow the first vehicle 130 into the tunnel 140. A screenshot 920 can include at least a third data object 426, and the GUI 250 can include a scroll function to fully view each of the data objects 426 displayed on the GUI 250. The GUI 250 can include one or more portions 422 which can be viewed by at least the operator via the scroll function.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be a cloud storage, a hard disk, a CD-ROM, a flash memory card, a PROM, a RAM, a ROM, or a magnetic tape. In general, the computer-readable programs can be implemented in any programming language or a script, such as Python, JavaScript, LISP, PERL, C, C++, C#, PROLOG, or JAVA. The software programs or executable instructions can be stored on or in one or more articles of manufacture as object code.

Example and non-limiting module implementation elements can include or use input providing devices, such as touchscreens, computer selection devices (e.g., computer mouse), detectors or sensors that can provide any value determined herein, as well as sensors providing any value that is a precursor to a value determined herein, datalink or network hardware including communication processors, circuits or chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more sets of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device", "computing environment", "component" or "data processing apparatus" or the like encompass various apparatuses, devices, and machines for processing data, including by way of example a programmable processor, a memory, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts or operations and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements from any section or paragraph, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or implementation, and references to "an implementation", "an implementation," "some implementations," "one implementation" or the like are not necessarily mutually exclusive and are intended to indicate that a particular feature, structure, or characteristic described in connection with the implementation may be included in at least one implementation or implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, numbers of inputs or outputs, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

For example, descriptions of positive and negative electrical characteristics may be reversed. For example, a positive or a negative parameter, input, or difficulty direction with respect to a testing system can be increased or decreased, as desired. Elements described as negative or decreasing in value can instead be configured as positive or increasing in value and vice versa. For example, elements described as having a lower difficulty level can have a higher difficulty level and vice versa. Further relative parameter values described with respect to other values can include variations within +/−10% or +/−10 degrees of a pure stated value, such as with +/−10 degrees of a pure vertical, parallel, or perpendicular positioning or a signal value. References to "approximately," "substantially" or other terms of degree include variations of +/−10% from the given measurement, unit, or range unless explicitly indicated otherwise. Coupled elements can be electrically, communicatively, mechanically, or physically coupled with one another directly or with intervening elements.

While the disclosure has been described with respect to specific implementations, one skilled in the art will recognize that numerous modifications are possible. For instance, although specific examples of rules (including triggering conditions and/or resulting actions) and processes for generating suggested rules are described, other rules and processes can be implemented. Implementations of the disclosure can be realized using a variety of computer systems and communication technologies including but not limited to specific examples described herein.

Implementations of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the implementations described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific implementations, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed implementations are not representative of all claimed innovations. As such, certain aspects of the disclosure have not been discussed herein. That alternate implementations may not have been presented for a specific portion of the innovations or that further undescribed alternate implementations may be available for a portion is not to be considered a disclaimer of those alternate implementations. Thus, it is to be understood that other implementations can be utilized and functional, logical, operational, organizational, structural and/or topological modifications may be made without departing from the scope of the disclosure. As such, all examples and/or implementations are deemed to be non-limiting throughout this disclosure.

Some implementations described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process, when possible, as well as performed sequentially as described above. Furthermore, certain implementations can omit one or more described events.

All definitions, as defined and used herein, should be understood to control over dictionary definitions, definitions in documents incorporated by reference, and/or ordinary meanings of the defined terms.

In the implementations, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A system, comprising:
one or more processors, coupled with memory, to:
provide, based on a first vehicle in a first lane of a plurality of lanes of a facility for providing vehicle car wash services, to each operator device of a plurality of operator devices executing a mobile application, first data corresponding to the first vehicle to cause the mobile application to present a first data object generated using the first data at a first portion of a graphical user interface (GUI) for displaying data of vehicles at the first lane, the first data object comprising a first image of the first vehicle and a first license plate information of the first vehicle;
provide, based on a second vehicle in a second lane of the plurality of lanes, to each operator device of the plurality of operator devices, second data corresponding to the second vehicle to cause the mobile application to present a second data object generated using the second data at a second portion of the GUI for displaying data of vehicles at the second lane, wherein the second data object is presented concurrently with the first data object, the second data object comprising a second image of the second vehicle and a second license plate information of the second vehicle;
determine that there is an issue at the first lane corresponding to the first vehicle, the issue corresponding to at least one of: a car wash service, a transaction for a car wash service, or a profile associated with a car wash service;
transmit, responsive to determining that there is the issue at the first lane, to each operator device of the plurality of operator devices, instructions to cause a respective mobile application of the operator device to present an assistance data object indicating an issue at the first lane corresponding to the first vehicle, the assistance data object including an active element;
receive, from a first operator device of the plurality of operator devices, interaction data generated responsive to an interaction with the active element of the assistance data object at the first operator device;
responsive to receiving the interaction data, transmit instructions to:
(i) cause the first mobile application of the first operator device to present a service data object comprising an interactive element to resolve the issue at the first lane corresponding to the first vehicle; and
(ii) cause each respective mobile application of a subset of the plurality of operator devices that excludes the first operator device, to present an indication that the issue at the first lane is being addressed;
transmit, responsive to determining that the first vehicle is not in the first lane, to each operator device of the plurality of operator devices, an instruction to cause the mobile application to cease the presentation of the first data object at the first portion of the GUI;
determine, subsequent to the transmitting the instruction, that a third vehicle is in the first lane; and
transmit, based on the third vehicle in the first lane, to each operator device of the plurality of operator devices, third data corresponding to the third vehicle to cause the mobile application to present at the first portion of the GUI a third data object generated using the third data, the third data object comprising a third image of the third vehicle and a third license plate information of the third vehicle.

2. The system of claim 1, wherein at least one of the first data, the second data or the third data comprises at least one of: a status of a lane, entity data associated with an entity profile, or vehicle data associated with a vehicle profile linked to the entity profile.

3. The system of claim 1, wherein at least one of the first data object, the second data object or the third data object generated using the at least one of the first data, the second data, or the third data is color coded based on a status of an operation associated with a third party server.

4. The system of claim 1, comprising the one or more processors to:
  transmit, responsive to determining that the first vehicle is not in the first lane, to each operator device of the plurality of operator devices, a placeholder data to cause the mobile application to present at the first portion of the GUI a placeholder data object generated using the placeholder data, the placeholder data object comprising an indication that the first lane is empty.

5. The system of claim 4, wherein the placeholder data is transmitted to each operator device of the plurality of operator devices in response to ceasing the presentation of the first data object at the first portion of the GUI.

6. The system of claim 1, comprising the one or more processors to:
  extract information from one or more images of the first vehicle in the first lane;
  identify, using a data structure, information associated with an entity profile associated with the first vehicle;
  select the first data based on the information associated with the entity profile; and
  generate a data package comprising the first data for transmission to each operator device of the plurality of operator devices.

7. The system of claim 6, wherein the data package comprises one or more instructions to cause each of the plurality of operator devices to generate the first data object by placing the information associated with the entity profile into one or more sub-portions of the first portion, and wherein the first data includes an identifier for the first portion of the GUI.

8. The system of claim 1, comprising the one or more processors to:
  extract, from a database, one or more field value pairs including at least one of: a license plate and a series of characters of the license plate of the first vehicle, a vehicle type and a make and model information of the first vehicle, a vehicle color information and a name of a color of the first vehicle; and
  construct the first data using the extracted one or more field value pairs.

9. The system of claim 1, comprising the one or more processors to:
  extract, from an entity profile associated with a driver of the second vehicle, data about the driver; and
  generate, based on the data about the driver, a note for display in the second portion of the GUI.

10. The system of claim 1, comprising the one or more processors to:
  identify an issue associated with the second vehicle, the issue corresponding to at least one of a point of sale operation or a selection of service to provide at the facility; and
  transmit, responsive to the identifying of the issue, fourth data corresponding to the second vehicle to cause the mobile application to present at the second portion of the GUI a fourth data object generated using the fourth data, the fourth data object comprising a request to assist with the issue associated with the second vehicle.

11. The system of claim 10, comprising the one or more processors to:
  receive, from a first operator device of the plurality of operator devices, a response to the request to assist; and
  transmit, responsive to receiving the response, fifth data to cause the mobile application to present, at the second portion of the GUI of at least a subset of the plurality of operator devices that excludes the first operator device, a fifth data object generated using the fifth data, the fifth data object comprising an indication that the issue associated with the second vehicle is being addressed.

12. The system of claim 11, comprising the one or more processors to: transmit, responsive to receiving the response, sixth data to cause the mobile application of the first operator device to present a sixth data object generated using the sixth data, the sixth data object comprising one or more windows to address the issue associated with the second vehicle.

13. The system of claim 11, comprising the one or more processors to:
  receive, from the first operator device subsequent to the response to the request, an updated response to the request to assist; and
  transmit, responsive to receiving the updated response, sixth data to cause the mobile application to present, at the second portion of the GUI of at least the subset of the plurality of operator devices, a sixth data object generated using the sixth data, the sixth data object comprising an indication that the issue associated with the second vehicle is addressed.

14. The system of claim 10, comprising the one or more processors to transmit, responsive to receiving an indication that the issue associated with the second vehicle is addressed, to a controller for a gate of the second lane, an instruction to actuate the gate.

15. The system of claim 14, comprising the one or more processors to:
  identify a queue of one or more vehicles for entering a tunnel of the facility; and
  include, following the instruction to actuate the gate, into the queue of one or more vehicles, an entry corresponding to the second vehicle.

16. The system of claim 1, comprising the one or more processors to:
  transmit, responsive to determining that the second vehicle is not in the second lane, request for information of a next vehicle in the second lane; and
  identify, responsive to the first data, information associated with a car wash service to provide to the first vehicle in a tunnel of the facility.

17. A method, comprising:
  providing, by one or more processors coupled with memory, based on a first vehicle in a first lane of a plurality of lanes of a facility for providing vehicle car wash services, to each operator device of a plurality of operator devices executing a mobile application, first data corresponding to the first vehicle to cause the mobile application to present a first data object generated using the first data at a first portion of a graphical user interface (GUI) for displaying data of vehicles at the first lane, the first data object comprising a first image of the first vehicle and a first license plate information of the first vehicle;
  providing, by the one or more processors, based on a second vehicle in a second lane of the plurality of lanes, to each operator device of the plurality of operator devices, second data corresponding to the second vehicle to cause the mobile application to present a second data object generated using the second data at a second portion of the GUI for displaying data of vehicles at the second lane, wherein the second data object is presented concurrently with the first data object, the second data object comprising a second image of the second vehicle and a second license plate information of the second vehicle;

determining, by the one or more processors, that there is an issue at the first lane corresponding to the first vehicle, the issue corresponding to at least one of: a car wash service, a transaction for a car wash service, or a profile associated with a car wash service;

transmitting, by the one or more processors, responsive to determining that there is the issue at the first lane, to each operator device of the plurality of operator devices, instructions to cause a respective mobile application of the operator device to present an assistance data object indicating an issue at the first lane corresponding to the first vehicle, the assistance data object including an active element;

receiving, by the one or more processors, from a first operator device of the plurality of operator devices, interaction data generated responsive to an interaction with the active element of the assistance data object at the first operator device;

responsive to receiving the interaction data, transmitting, by the one or more processors, instructions to:
  (i) cause the first mobile application of the first operator device to present a service data object comprising an interactive element to resolve the issue at the first lane corresponding to the first vehicle; and
  (ii) cause each respective mobile application of a subset of the plurality of operator devices that excludes the first operator device, to present an indication that the issue at the first lane is being addressed;

transmitting, by the one or more processors, responsive to determining that the first vehicle is not in the first lane, to each operator device of the plurality of operator devices, an instruction to cause the mobile application to cease the presentation of the first data object at the first portion of the GUI;

determining, by the one or more processors, subsequent to the transmitting the instruction, that a third vehicle is in the first lane; and transmitting, by the one or more processors, based on the third vehicle in the first lane, to each operator device of the plurality of operator devices, third data corresponding to the third vehicle to cause the mobile application to present at the first portion of the GUI a third data object generated using the third data, the third data object comprising a third image of the third vehicle and a third license plate information of the third vehicle.

18. The method of claim 17, wherein at least one of the first data, the second data or the third data comprises at least one of: a status of a lane, entity data associated with an entity profile, or vehicle data associated with a vehicle profile linked to the entity profile.

19. The method of claim 17, wherein at least one of the first data object, the second data object or the third data object generated using the at least one of the first data, the second data, or the third data is color coded based on a status of an operation associated with a third party server.

20. The method of claim 17, further comprising:
transmitting, by the one or more processors, responsive to determining that the first vehicle is not in the first lane, to each operator device of the plurality of operator devices, a placeholder data to cause the mobile application to present at the first portion of the GUI a placeholder data object generated using the placeholder data, the placeholder data object comprising an indication that the first lane is empty.

* * * * *